US012803349B2

(12) United States Patent
Yabe et al.

(10) Patent No.: US 12,803,349 B2
(45) Date of Patent: Nov. 17, 2026

(54) ROTARY ELECTRIC MACHINE

(71) Applicant: Mitsubishi Electric Corporation, Tokyo (JP)

(72) Inventors: Mitoru Yabe, Tokyo (JP); Junya Suzuki, Tokyo (JP); Shinichi Ito, Tokyo (JP); Takashi Yamamoto, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 18/705,752

(22) PCT Filed: Jan. 14, 2022

(86) PCT No.: PCT/JP2022/001071
§ 371 (c)(1),
(2) Date: Apr. 29, 2024

(87) PCT Pub. No.: WO2023/135730
PCT Pub. Date: Jul. 20, 2023

(65) Prior Publication Data

US 2026/0135424 A1 May 14, 2026

(51) Int. Cl.
*H02K 1/2781* (2022.01)
*H02K 1/27* (2022.01)
*H02K 7/00* (2006.01)

(52) U.S. Cl.
CPC ............... *H02K 1/27* (2013.01); *H02K 7/003* (2013.01)

(58) Field of Classification Search
CPC ............................. H02K 1/278; H02K 1/2781
See application file for complete search history.

(56) References Cited

U.S. PATENT DOCUMENTS

2005/0017587 A1* 1/2005 Koenig .................. H02K 1/278 310/156.19
2007/0222317 A1* 9/2007 Morel .................... H02K 1/278 310/156.01

(Continued)

FOREIGN PATENT DOCUMENTS

| | | | |
|---|---|---|---|
| DE | 10216098 | A1 | 10/2003 |
| JP | 4793677 | B2 | 10/2011 |
| WO | 2005/119879 | A1 | 12/2005 |

OTHER PUBLICATIONS

Extended European Search Report issued Feb. 28, 2025 in Application No. 22920255.1.

(Continued)

*Primary Examiner* — Oluseye Iwarere
*Assistant Examiner* — Masoud Vaziri
(74) *Attorney, Agent, or Firm* — Sughrue Mion, PLLC

(57) ABSTRACT

A rotary electric machine includes a stator and a rotor. The rotor includes a rotating shaft and a laminated steel sheet constituted by a plurality of electromagnetic steel sheets fixed to the rotating shaft. The laminated steel sheet includes a first electromagnetic steel sheet fixing a first magnet and a second electromagnetic steel sheet fixing a second magnet. The first electromagnetic steel sheet includes a first fixed positioning protrusion and a first movable protrusion. The second electromagnetic steel sheet includes a second fixed positioning protrusion and a second movable protrusion. A plurality of first magnets and a plurality of second magnets are alternately disposed in the circumferential direction.

8 Claims, 23 Drawing Sheets

(56) References Cited

U.S. PATENT DOCUMENTS

| | | | | |
|---|---|---|---|---|
| 2012/0133229 | A1* | 5/2012 | Jayasoma | H02K 1/28 310/156.01 |
| 2016/0322873 | A1* | 11/2016 | Udo | H02K 1/28 |
| 2017/0126081 | A1* | 5/2017 | Kim | H02K 1/2773 |
| 2019/0386528 | A1* | 12/2019 | Lee | H02K 1/278 |
| 2022/0278574 | A1* | 9/2022 | Oh | H02K 1/278 |

OTHER PUBLICATIONS

Communication dated Sep. 7, 2026, issued in European application No. 22920255.1.

* cited by examiner

ROTARY ELECTRIC MACHINE

CROSS REFERENCE TO RELATED APPLICATIONS

This application is a National Stage of International Application No. PCT/JP2022/001071 filed Jan. 14, 2022.

DESCRIPTION

Technical Field

The present disclosure relates to a rotary electric machine.

Background Art

Conventionally, in a rotary electric machine in which a rotor unit rotates inside a coil, a structure in which magnets are fixed to an outer circumferential surface of a rotor constituted by electromagnetic steel sheets using an adhesive is known.

Patent Literature 1 discloses a structure in which a magnet is pushed between a fixed positioning protrusion and a movable positioning protrusion, and the magnet is fixed with an adhesive.

CITATION LIST

Patent Document

Patent Literature 1
Japanese Patent No. 4793677

SUMMARY OF INVENTION

Problem to be Solved by the Invention

However, in such a conventional rotary electric machine, the fixed positioning protrusion and the movable positioning protrusion need to be disposed at a distance from each other. Therefore, there has been problems that a distance between magnets adjacent to each other increases, a size of the rotary electric machine increases, a region in which a magnetic force is low increases, and a drive efficiency decreases.

The present invention was made in order to solve the above-described problems, and an objective of the present disclosure is to provide a rotary electric machine that improves a drive efficiency.

Means to Solve the Problem

A rotary electric machine according to the present disclosure includes a stator and a rotor. The rotor includes a rotating shaft, a laminated steel sheet constituted by a plurality of electromagnetic steel sheets fixed to the rotating shaft and having an outer circumferential portion, and a plurality of first magnets and a plurality of second magnets disposed alternately on the outer circumferential portion in a circumferential direction. The rotor is spaced apart from the stator and surrounded by the stator. The laminated steel sheet includes a first electromagnetic steel sheet fixing the plurality of first magnets, and a second electromagnetic steel sheet fixing the plurality of second magnets. The first electromagnetic steel sheet includes a first fixed positioning protrusion positioning one end of each of the first magnets in the circumferential direction and protruding toward the outside of the first electromagnetic steel sheet, and a first movable protrusion pressing the other end of each of the first magnets in the circumferential direction toward the first fixed positioning protrusion and protruding toward the outside of the first electromagnetic steel sheet. The second electromagnetic steel sheet includes a second fixed positioning protrusion positioning one end of each of the second magnets in the circumferential direction and protruding toward the outside of the second electromagnetic steel sheet, and a second movable protrusion pressing the other end of each of the second magnets in the circumferential direction toward the second fixed positioning protrusion and protruding toward the outside of the second electromagnetic steel sheet.

Effects of the Invention

According to the rotary electric machine according to the present disclosure, a drive efficiency can be improved.

DESCRIPTION OF EMBODIMENTS

Figure 1:
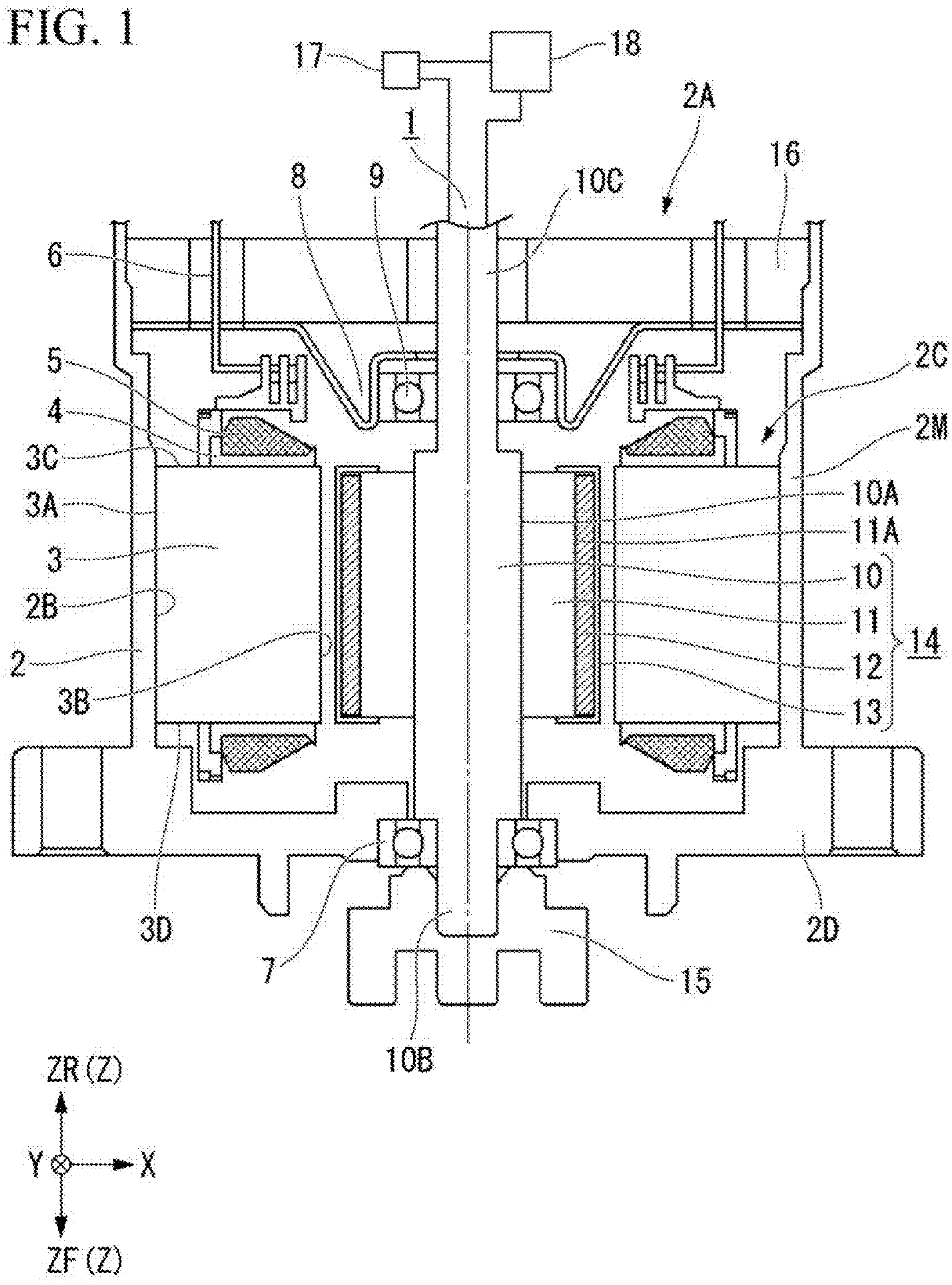
FIG. 1 is a cross-sectional view showing a rotary electric machine according to a first embodiment.

A rotary electric machine according to embodiments will be described with reference to FIGS. 1 to 24.

In FIGS. 1 to 24, components the same as or similar to each other will be denoted by the same reference numerals.

The drawings show the embodiments schematically or conceptually. A relationship between a thickness and a width of each portion, a size ratio between portions, or the like shown in the drawings are not necessarily the same as those of the actual members.

Configurations that are not related to features of the present disclosure may be omitted in the drawings.

A rotary electric machine according to a first embodiment is applied to an electric power steering device mounted on a vehicle. The power steering device includes a control device that controls the rotary electric machine. The control device assists a steering force in steering of the vehicle. In FIGS. 1 to 24, such a control device may be omitted in the drawings.

In the drawing, an X direction, a Y direction, and a Z direction corresponding to a three-dimensional orthogonal coordinate system are shown (reference letters X, Y, and Z). The Z direction coincides with an axial direction of the rotary electric machine. The X direction and the Y direction intersect (for example, they are orthogonal to) the Z direction. The X direction and the Y direction intersect each other (for example, they are orthogonal to each other).

Further, in the drawings, a direction intersecting the X direction and the Y direction may be shown. For example, a direction intersecting the X direction is referred to as a first cross direction CR. A direction intersecting the Y direction is referred to as a second cross direction CS. An angle between the first cross direction CR and the X direction is, for example, 45 degrees. An angle between the second cross direction CS and the Y direction is, for example, 45 degrees. The first cross direction CR and the second cross direction CS intersect each other (for example, they are orthogonal to each other).

The terms "circumferential direction," "radial direction," and "axial direction" used in the following description correspond to a "circumferential direction," a "radial direction," and an "axial direction" in the rotary electric machine, respectively. Further, the term "radially outward" means a direction toward the outside from a center of a stator in the radial direction. The term "radially inward" means a direction toward the center from outside of the stator in the radial direction.

"Front side" and "rear side" may be used as terms for describing a configuration of the rotary electric machine. The front side means a position at which a member for mounting the rotary electric machine to the vehicle is disposed. The rear side is a side opposite to the front side. The control device is disposed on the rear side. For example, in FIG. 1, reference letter ZF (in the Z direction) means the front side.

Reference letter ZR (in the Z direction) means the rear side.

First Embodiment

A rotary electric machine according to a first embodiment will be described with reference to FIGS. 1 to 13.

<Overall Configuration of Rotary Electric Machine 1>

FIG. 1 is a cross-sectional view showing a rotary electric machine 1.

The rotary electric machine 1 includes a frame 2, a stator 3, an insulator 4, a stator winding 5, a terminal 6, a bearing 7, a bearing holder 8, a bearing 9, a rotor unit 14, and a joint 15, and a heat sink 16.

A sensor 17 that detects a driving state of the rotary electric machine 1 and a control device 18 that controls driving of the rotary electric machine 1 are connected to the rotary electric machine 1.

<Frame 2>

The frame 2 is a housing that constitutes the rotary electric machine 1. A material forming the frame 2 is, for example, an inexpensive and lightweight aluminum alloy. The frame 2 includes a frame main body 2M and a pedestal 2D. The frame main body 2M has an opening 2A and an inner wall surface 2B. The opening 2A is a portion positioned on the rear side of the frame 2. A region in which the inner wall surface 2B is exposed, that is, a space inside the frame main body 2M, is an inner region 2C in which a plurality of members constituting the rotary electric machine 1 are disposed.

The frame main body 2M has a substantially cylindrical shape. The term "substantially cylindrical shape" means an overall shape of the frame main body 2M, and does not necessarily mean only a geometrically defined cylinder. The term "substantially cylindrical shape" has a meaning including a shape in which corner portions of the cylindrical shape are chamfered, a shape including manufacturing errors, and a cylindrical shape that partially includes a protruding portion, a recessed portion, a step, or the like.

The pedestal 2D is a portion provided on the front side of the frame 2. A screw hole is formed in the pedestal 2D. A known fastening member such as a screw is inserted through the screw hole. The rotary electric machine 1 is fixed to a power steering device via the pedestal 2D.

<Stator 3>

The stator 3 is disposed in the inner region 2C and fixed to the frame 2.

The stator 3 has a plurality of electromagnetic steel sheets. The plurality of electromagnetic steel sheets are laminated, for example, in the axial direction.

The stator 3 has a stator outer surface 3A at a position on the radially outer side of the stator 3.

The stator 3 has a stator inner surface 3B at a position on the radially inner side of the stator 3.

In the axial direction, the stator 3 has a stator upper surface 3C and a stator lower surface 3D. The stator lower surface 3D is a surface positioned on a side opposite to the stator upper surface 3C.

The stator 3 can also be referred to as, for example, a stator core.

With the stator 3 disposed in the inner region 2C, the stator outer surface 3A faces the inner wall surface 2B of the frame 2. The stator outer surface 3A and the inner wall surface 2B are in direct contact. For example, a fixing member for fixing the stator 3 to the inner region 2C may be disposed between the stator outer surface 3A and the inner wall surface 2B.

With the stator 3 disposed in the inner region 2C, the stator inner surface 3B faces the rotor unit 14.

<Insulator 4>

The insulator 4 is formed of a known insulating material, for example, a resin material.

The insulator 4 is disposed on the stator 3 to cover a portion of the stator upper surface 3C and a portion of the stator lower surface 3D. The insulator 4 is disposed between the stator 3 and the stator winding 5. The insulator 4 electrically insulates the stator winding 5 and the stator 3.

<Stator Winding 5>

The stator winding 5 is a known wiring, for example, a copper wire coated with an insulating film such as a resin.

The stator winding 5 is wound around the stator 3 such that the insulator 4 is interposed between the stator 3 and the stator winding 5.

<Terminal 6>

The terminal 6 is formed of a known metal material having conductivity.

The terminal 6 is electrically connected to the stator winding 5. The terminal 6 is electrically connected to the control device 18 positioned outside the rotary electric machine 1. The terminal 6 supplies power output from the control device 18 to the stator winding 5.

<Bearing 7, Bearing Holder 8, Bearing 9>

The bearing 7 and the bearing 9 are, for example, known ball bearings or roller bearings. The bearing holder 8 is disposed on the rear side of the frame 2. In other words, the bearing holder 8 is positioned at the opening 2A of the frame 2.

The bearing 7 is disposed on the front side of the frame 2. In other words, the bearing 7 is disposed at a position on a radially inner side on the pedestal 2D of the frame 2, that is, on the axial direction.

The bearing 9 is disposed on the rear side of the frame 2. In other words, the bearing 9 is disposed at a position radially inside of the bearing holder 8, that is, on the axial direction.

<Rotor Unit 14>

Figure 2:
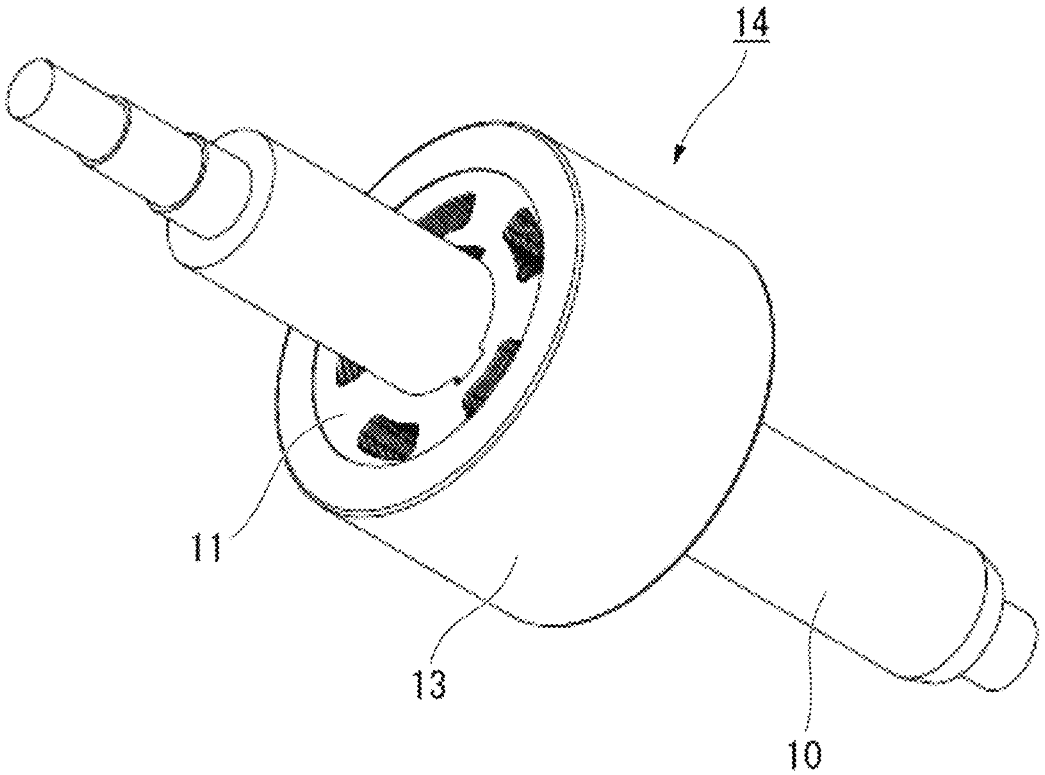
FIG. 2 is a perspective view showing a rotor unit according to the first embodiment.

FIG. 2 is a perspective view showing the rotor unit 14.

The rotor unit 14 is an example of a rotor.

The rotor unit 14 includes a rotating shaft 10, a rotor core 11, a plurality of magnets 12, and a protective tube 13. The rotor unit 14 is spaced apart from the stator 3 and is disposed to be surrounded by the stator 3.

The rotating shaft 10 is formed of, for example, a known metal material. The front side of the rotating shaft 10 is supported by the bearing 7 to be rotatable. The rear side of the rotating shaft 10 is supported by the bearing 9 to be rotatable. The rotating shaft 10 has a central region 10A positioned between the front side and the rear side. On the front side of the rotating shaft 10, the rotating shaft 10 has an end part 10B positioned outside the bearing 7. On the rear side of the rotating shaft 10, the rotating shaft 10 has an end part 10C positioned outside the bearing 9.

The rotor core 11 has a plurality of electromagnetic steel sheets. The electromagnetic steel sheet is formed of a known metal material. The plurality of electromagnetic steel sheets constituting the rotor core 11 are laminated, for example, in the axial direction. The rotor core 11 is fixed in the central region 10A of the rotating shaft 10. The rotor core 11 has an outer circumferential portion 11A positioned on the radially outer side.

The plurality of magnets 12 are each formed of a known magnetic material.

The plurality of magnets 12 are adhered to the outer circumferential portion 11A of the rotor core 11. That is, the plurality of magnets 12 are fixed to the outer circumferential portion 11A of the rotor core 11.

The protective tube 13 is formed of a known non-magnetic material such as stainless steel or aluminum.

The protective tube 13 covers a portion on a radially outer side of the rotor unit 14 including the plurality of magnets 12. The protective tube 13 is provided on an outer side of the magnets 12 fixed to the rotor core 11. The protective tube 13 is formed by, for example, deep drawing.

The protective tube 13 is a member for preventing rotation of the rotor unit 14 from stopping when the magnet 12 breaks or comes off from the rotor unit 14. The protective tube 13 is attached to the rotor unit 14. Further, the rotor unit 14 does not need to include the protective tube 13, but a configuration in which the rotor unit 14 includes the protective tube 13 is employed in the first embodiment.

<Joint 15>

The joint 15 is provided at the end part 10B of the rotating shaft 10.

The joint 15 is a member for assembling the end part 10B of the rotating shaft 10 and a rotating shaft of the vehicle. The joint 15 is formed of, for example, a known strong metal material.

<Heat Sink 16>

The heat sink 16 is disposed on the rear side of the frame 2. In other words, the heat sink 16 is disposed at an opening end of the opening 2A of the frame 2 positioned on an outer side of the bearing holder 8. The heat sink 16 is formed of a known metal material having excellent thermal conductivity. A control device which is not shown in the drawings is provided in the heat sink 16.

<Sensor 17>

The sensor 17 is provided at the end part 10C of the rotating shaft 10. The sensor 17 detects a rotation state of the rotor core 11. The sensor 17 is, for example, a known rotation angle detection sensor.

<Control Device 18>

The control device 18 includes a power conversion circuit and a control circuit. The power conversion circuit is, for example, a power conversion circuit including a power semiconductor. The power conversion circuit converts a direct current supplied from outside of the control device 18 into an alternating current. The control device 18 controls an amount of current supplied to the stator winding 5 via the terminal 6.

In the rotary electric machine 1 having the above-described structure, a rotational force is generated in the rotor core 11 according to an amount of power supplied to the rotary electric machine 1. When the rotor unit 14 rotates, the joint 15 rotates, and the rotating shaft of the vehicle rotates.

<Detailed Structure of Rotor Unit 14>

Next, a configuration of the rotor unit 14 according to the first embodiment will be described in detail.

Figure 3:
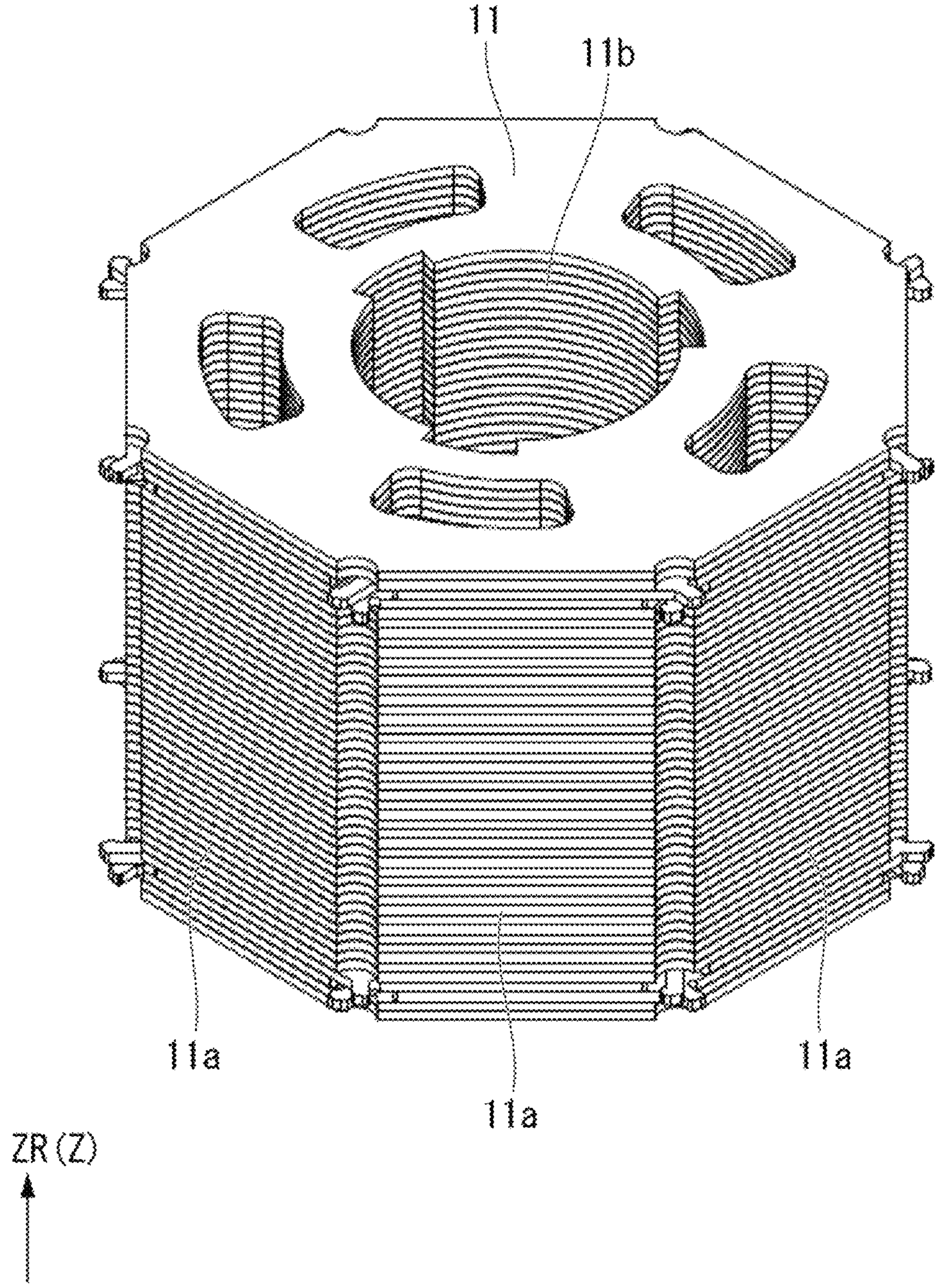
FIG. 3 is a perspective view showing a rotor core according to the first embodiment.
Figure 4:
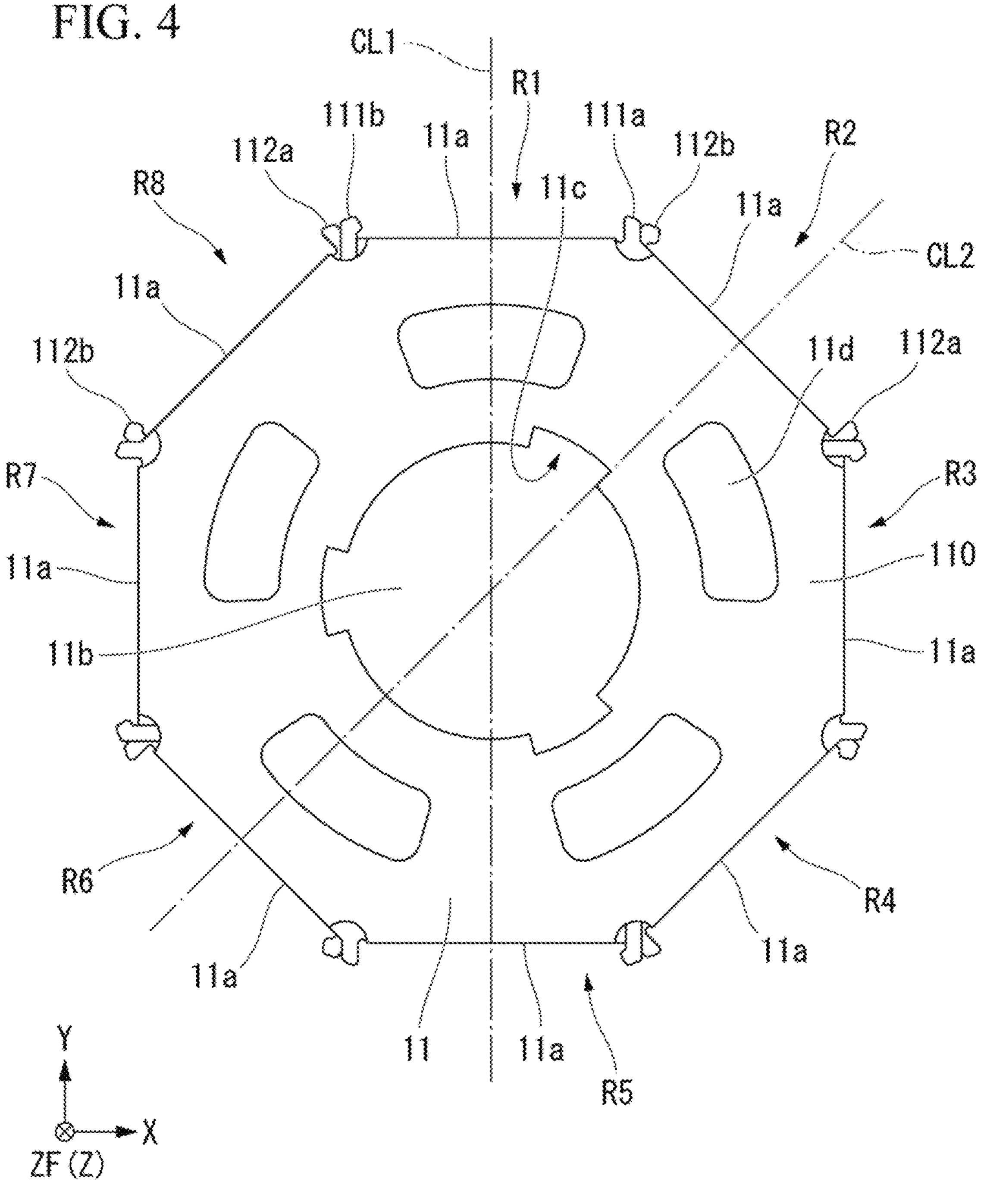
FIG. 4 is a top view showing the rotor core according to the first embodiment.
Figure 5:
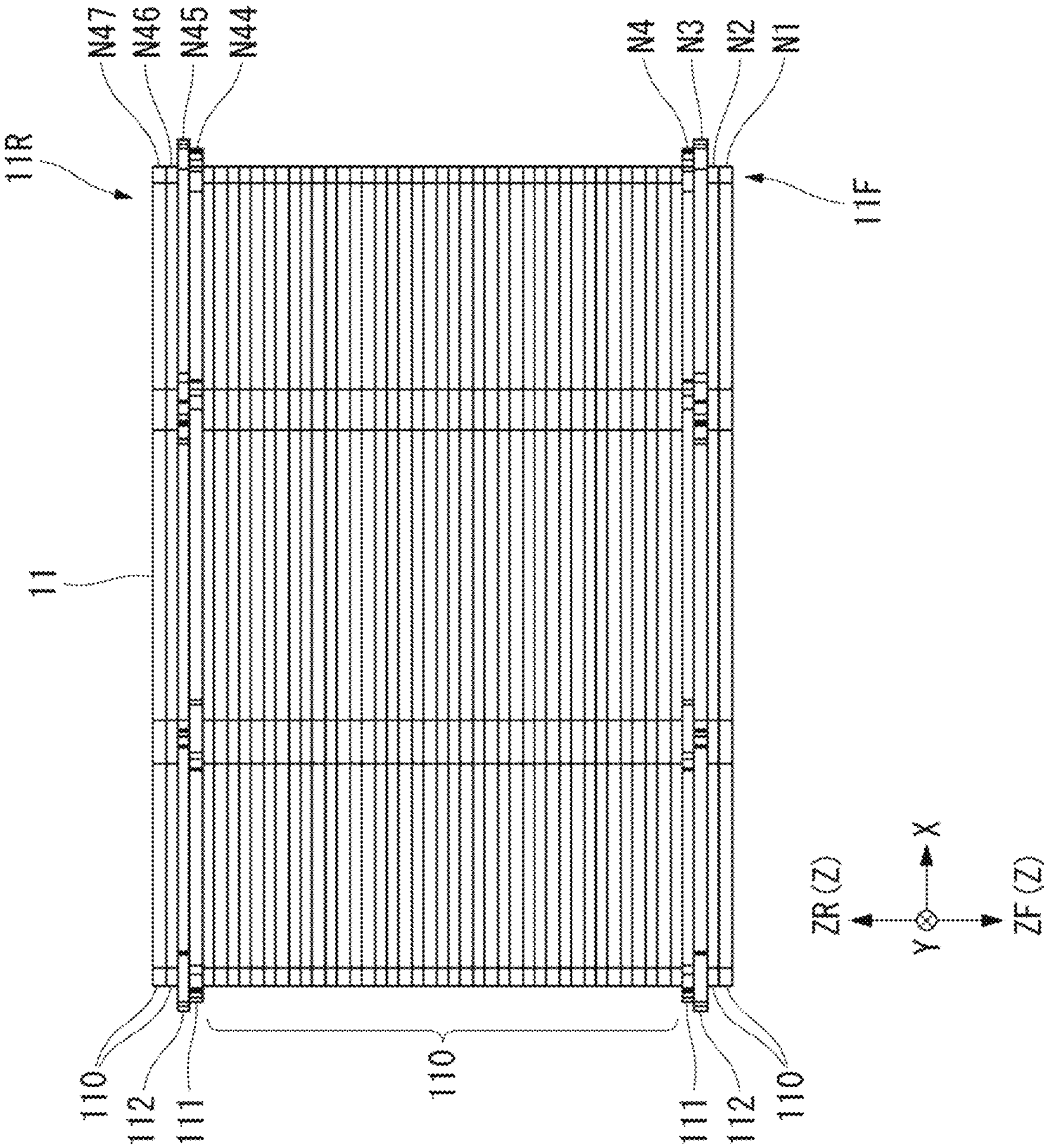
FIG. 5 is a front view showing the rotor core according to the first embodiment.
Figure 6:
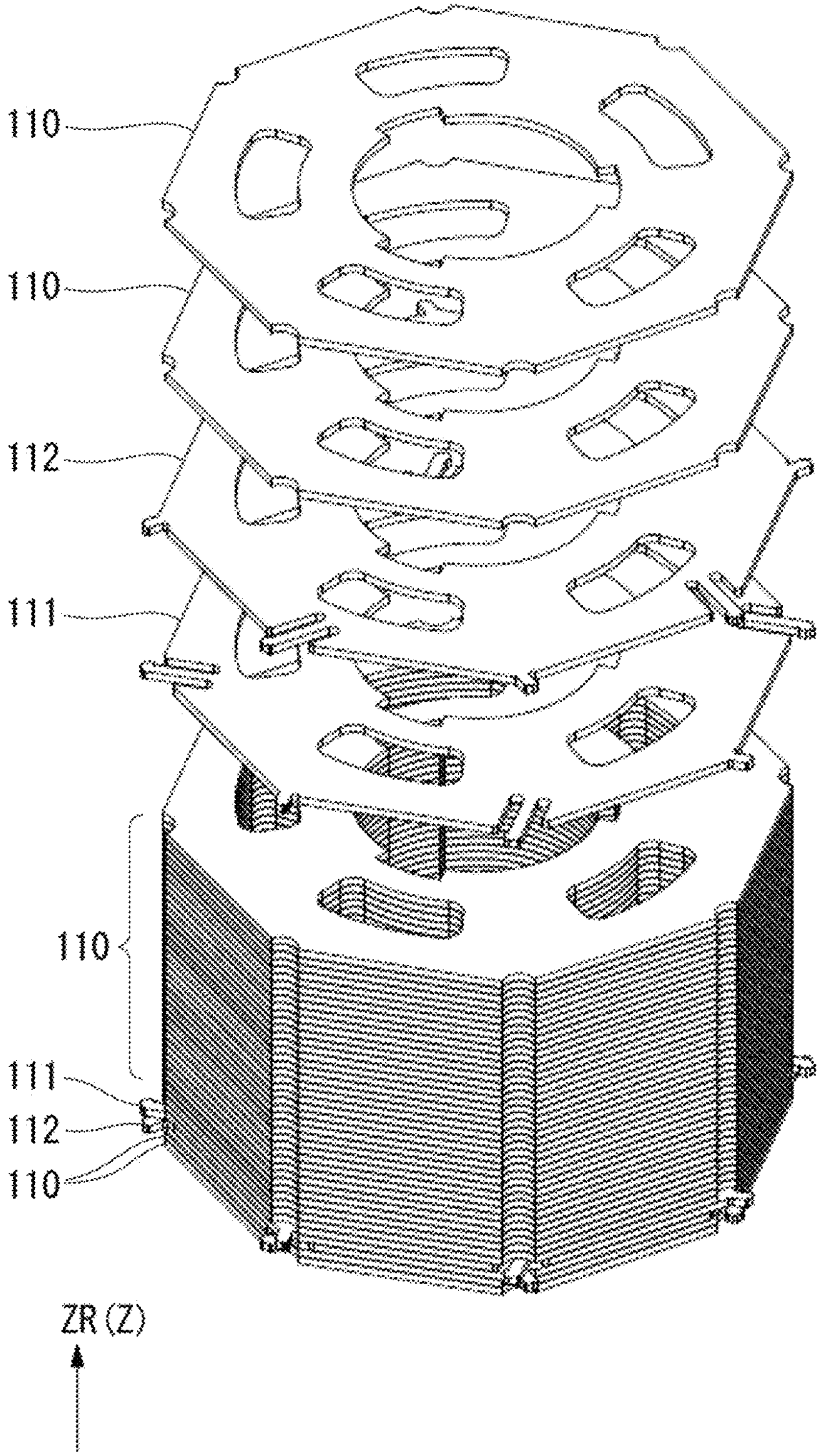
FIG. 6 is a partially exploded view showing the rotor core according to the first embodiment.
Figure 7:
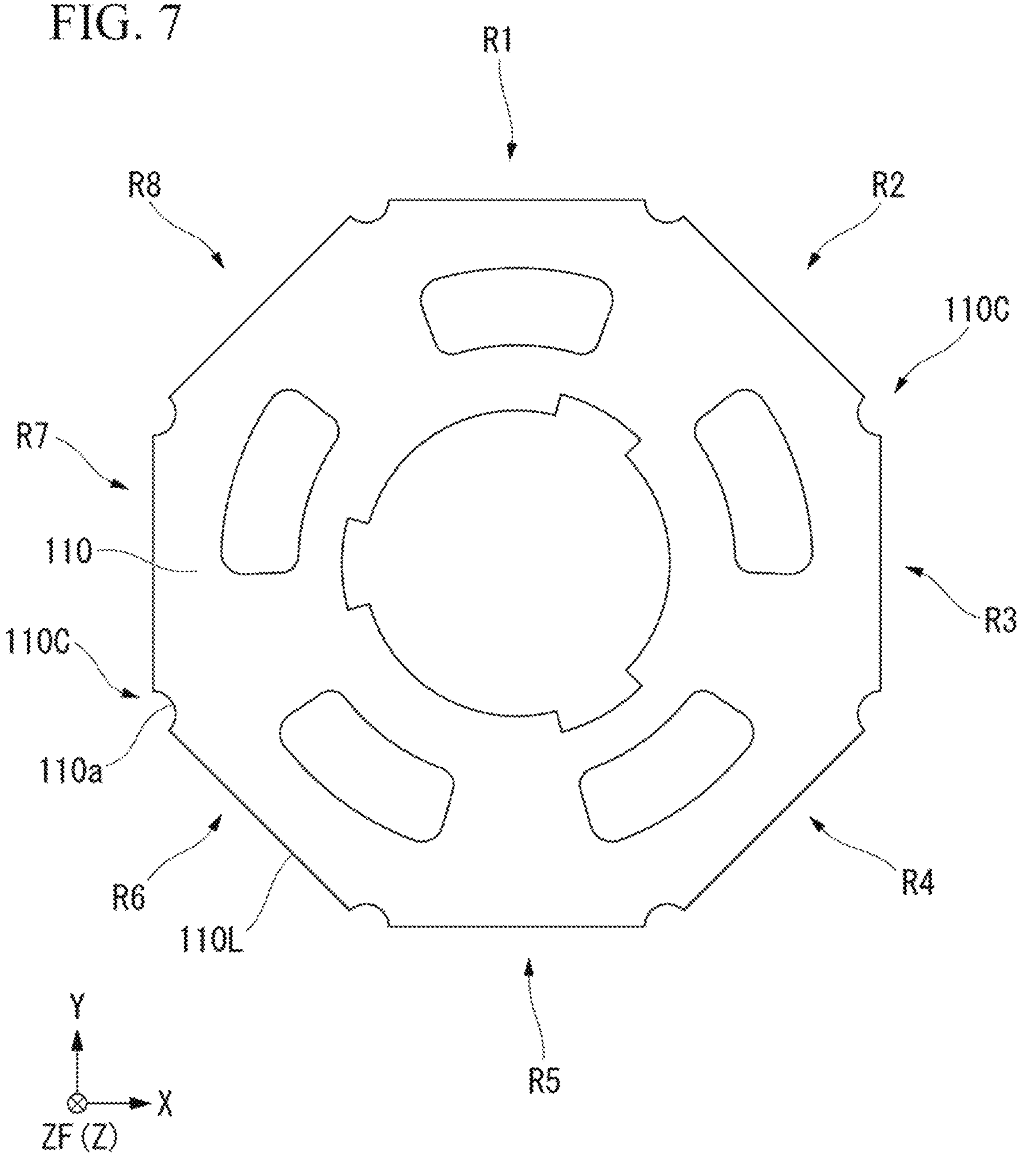
FIG. 7 is a top view showing a non-protruding electromagnetic steel sheet according to the first embodiment.
Figure 8:
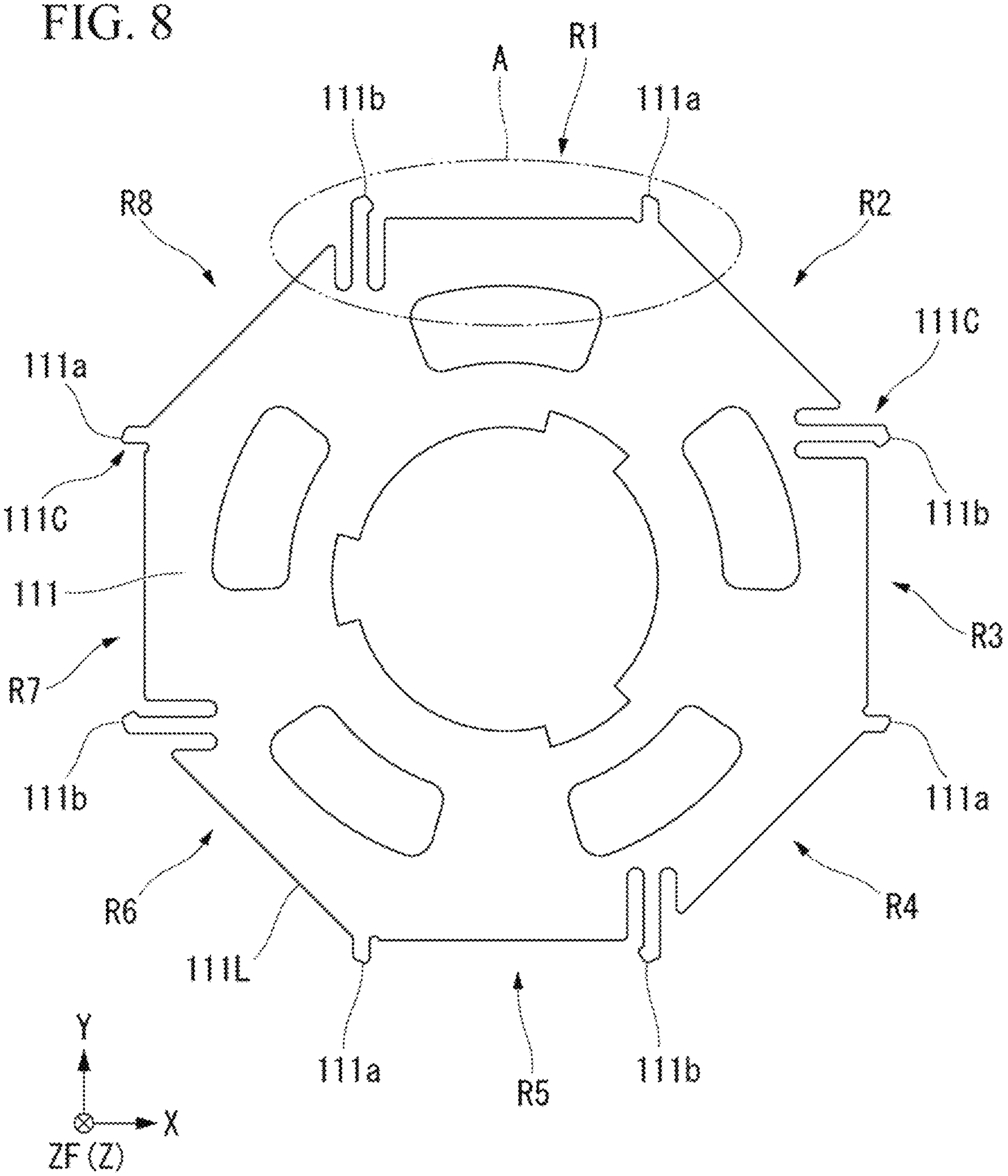
FIG. 8 is a top view showing a first electromagnetic steel sheet according to the first embodiment.
Figure 9:
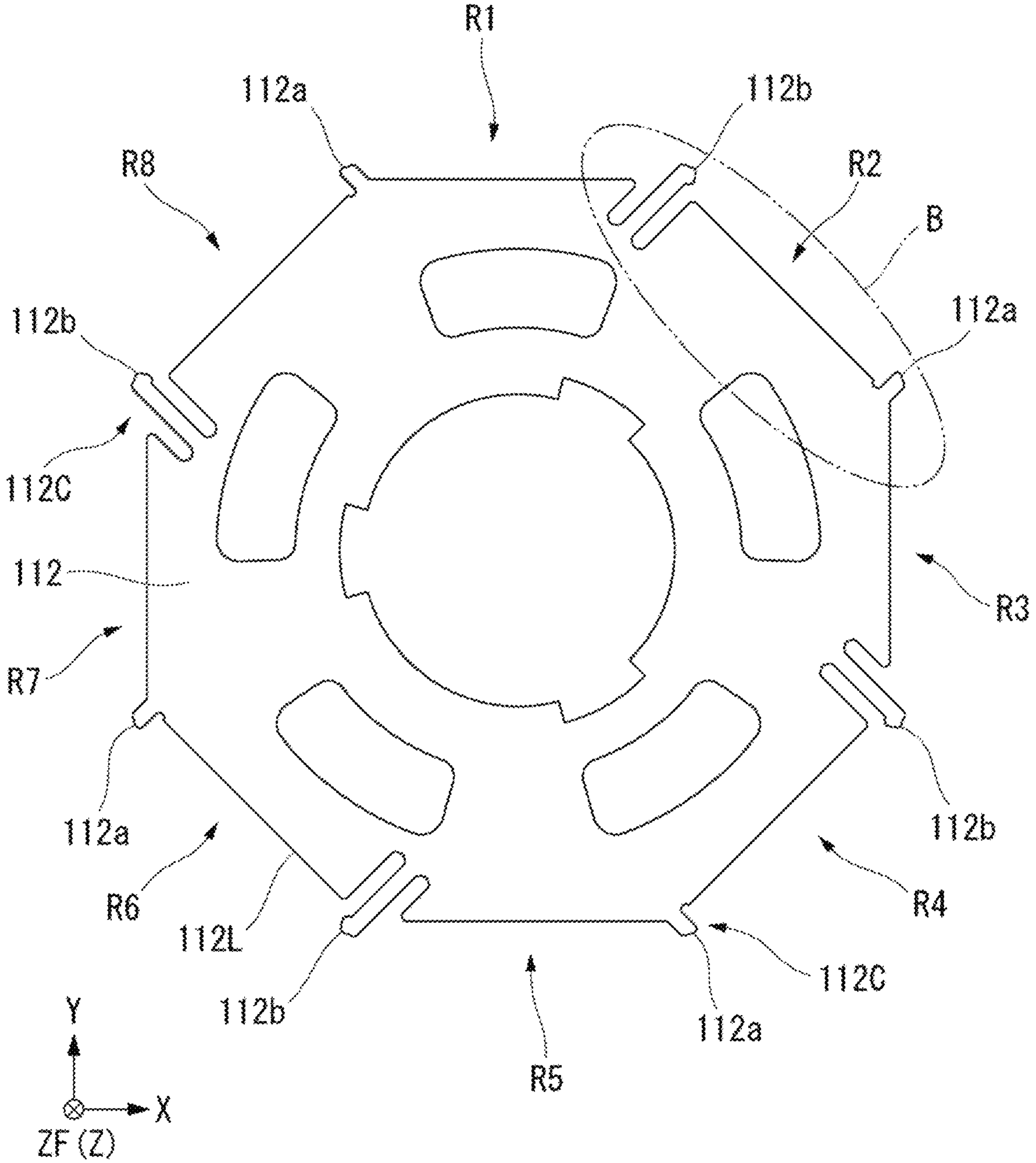
FIG. 9 is a top view showing a second electromagnetic steel sheet according to the first embodiment.
Figure 10:
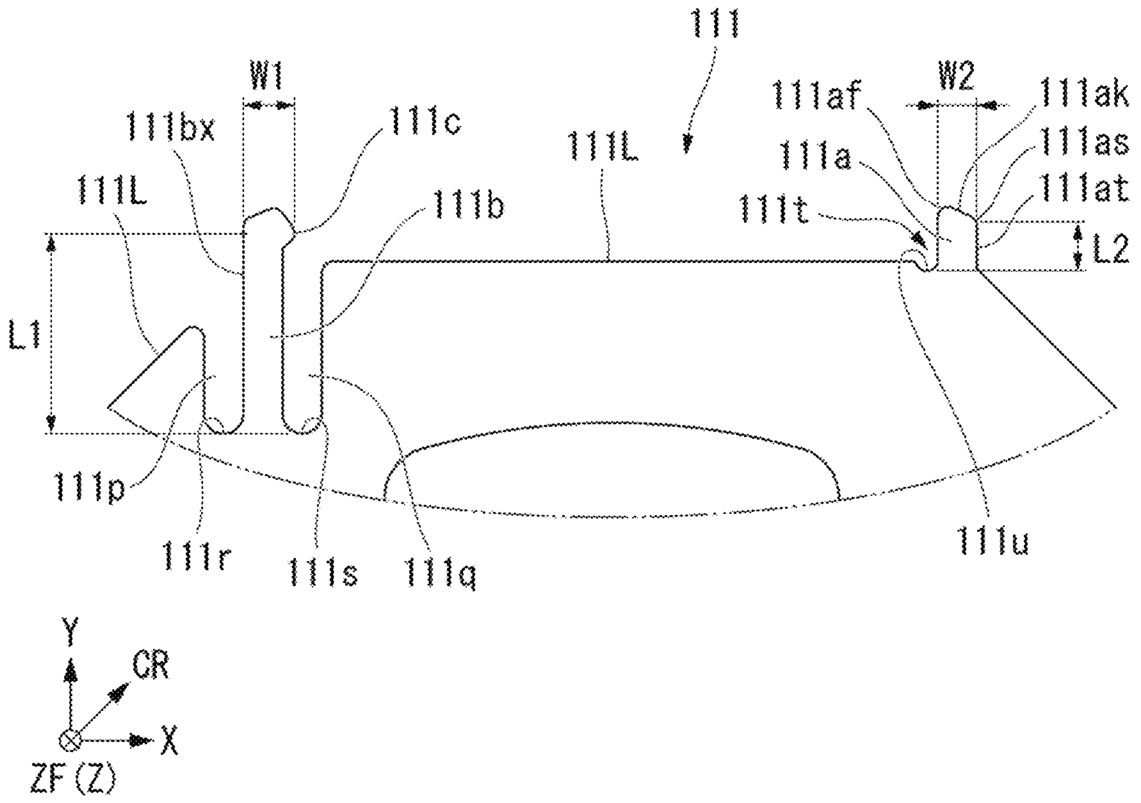
FIG. 10 is a view showing the first electromagnetic steel sheet according to the first embodiment, and is an enlarged view showing the portion indicated by reference letter A in FIG. 8.
Figure 11:
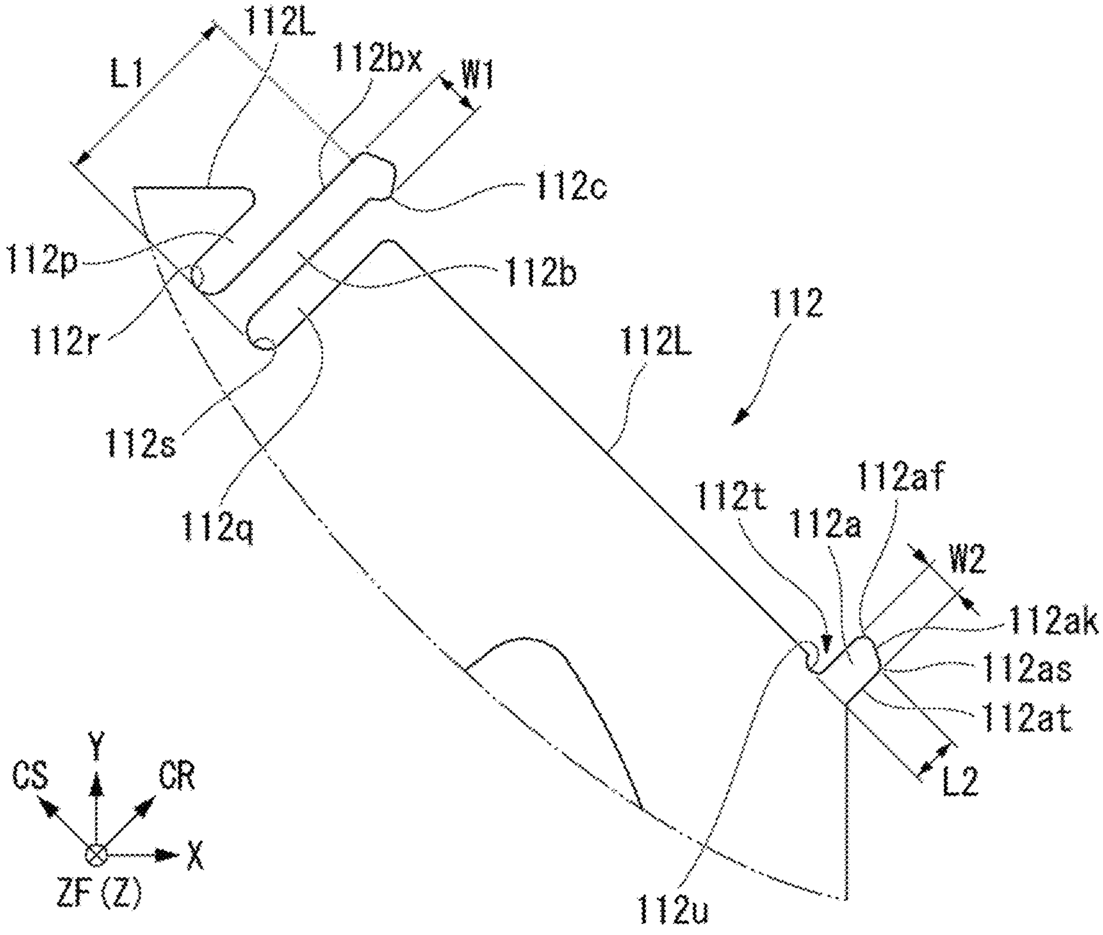
FIG. 11 is a view showing the second electromagnetic steel sheet according to the first embodiment, and is an enlarged view showing the portion indicated by reference letter B in FIG. 9.
Figure 12:
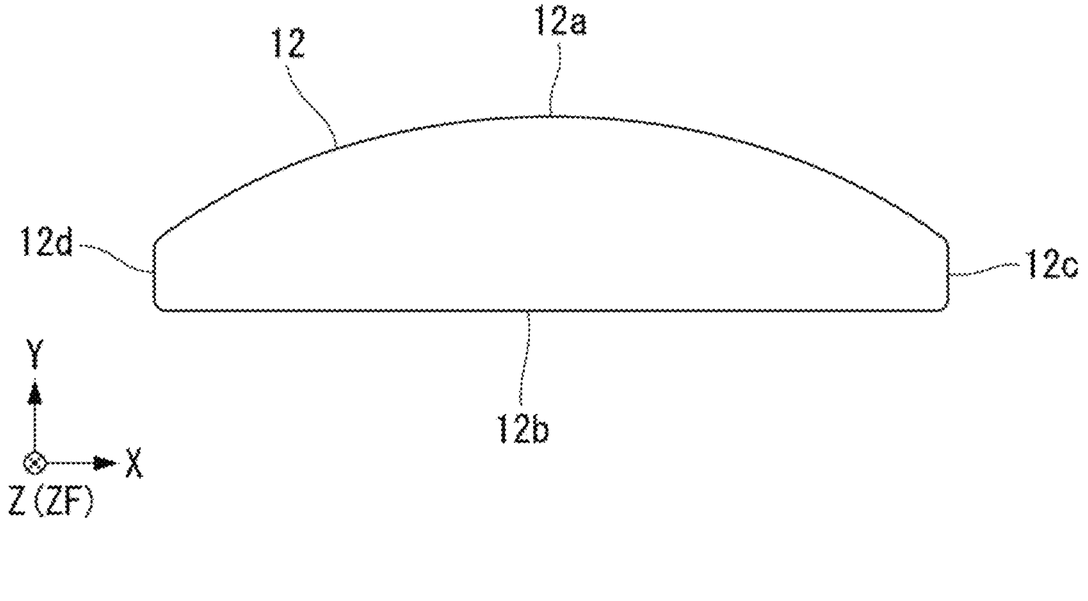
FIG. 12 is a top view showing a magnet according to the first embodiment.
Figure 13:
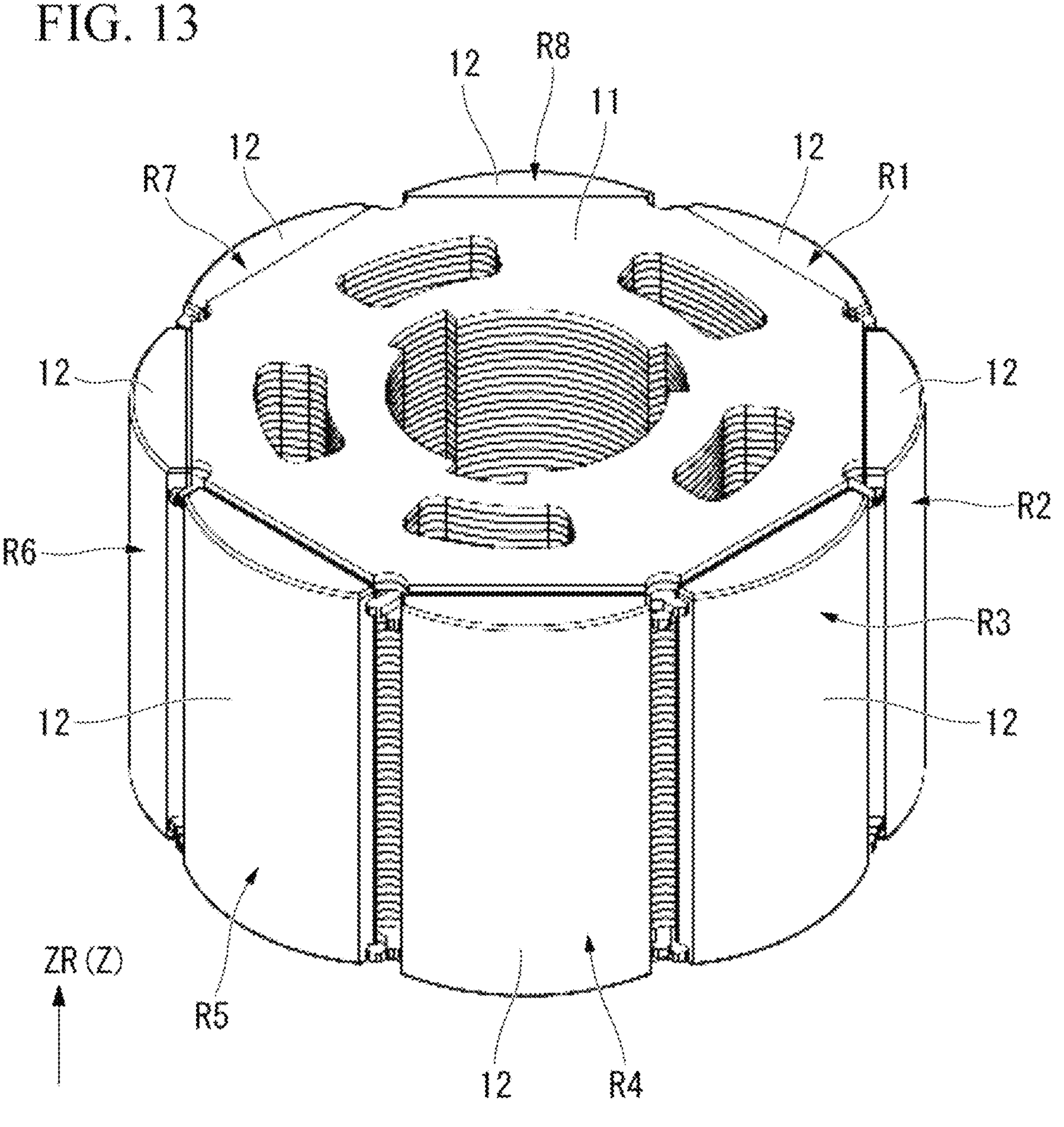
FIG. 13 is a perspective view showing the rotor core after the magnets according to the first embodiment is attached.

FIG. 3 is a perspective view showing the rotor core 11. FIG. 4 is a top view showing the rotor core 11. FIG. 5 is a front view showing the rotor core 11. FIG. 6 is a partially exploded view showing the rotor core 11. FIG. 7 is a top view showing a non-protruding electromagnetic steel sheet 110. FIG. 8 is a top view showing a first electromagnetic steel sheet 111. FIG. 9 is a top view showing a second electromagnetic steel sheet 112. FIG. 10 is a view showing the first electromagnetic steel sheet 111, and is an enlarged view showing the portion indicated by reference letter A in FIG. 8. FIG. 11 is a view showing the second electromagnetic steel sheet 112, and is an enlarged view showing the portion indicated by reference letter B in FIG. 9. FIG. 12 is a top view showing the magnets 12. FIG. 13 is a perspective view showing a state after the magnets 12 are attached to the rotor core 11.

The rotor unit 14 is constituted by the plurality of electromagnetic steel sheets fixed to the rotating shaft 10. The rotor unit 14 includes a laminated steel sheet having the outer circumferential portion 11A. The rotor unit 14 includes the plurality of magnets 12 disposed in the circumferential direction on the outer circumferential portion 11A. The rotor unit 14 is spaced apart from the stator 3 and surrounded by the stator 3.

The rotor core 11 is an example of the laminated steel sheet in which a plurality of electromagnetic steel sheets are laminated in the Z direction.

The rotor core 11 has an outer shape formed in, for example, a substantially regular octagonal prism shape. The substantially regular octagonal prism shape means an overall shape of the rotor core 11, and does not necessarily mean only a geometrically defined regular octagonal prism. The term "substantially regular octagonal prism" has a meaning including a shape in which corner portions of the regular octagonal prism are chamfered, a shape including manufacturing errors, and a regular octagonal prism shape that partially includes a protruding portion protruding outward in the radial direction, a recessed portion recessed inward in the radial direction, a step, or the like.

The rotor core 11 has eight outer circumferential surfaces 11*a* at positions on a radially outer side.

The eight outer circumferential surfaces 11*a* are each a region on which the magnet 12 is disposed. The eight outer circumferential surfaces 11*a* disposed clockwise in the circumferential direction may be referred to as a first disposition region R1, a second disposition region R2, a third disposition region R3, a fourth disposition region R4, a fifth disposition region R5, and a sixth disposition region R6, a seventh disposition region R7, and an eighth disposition region R8 in order. The outer circumferential surface 11*a* corresponds to the outer circumferential portion 11A.

The rotor core 11 has one first through hole 11*b* at a position on the radially inner side. In other words, the first through hole 11*b* is provided at a center of the rotor core 11. The first through hole 11*b* is a portion into which the rotating shaft 10 is inserted. The first through hole 11*b* has an engaging recessed portion 11*c*. The engaging recessed portion 11*c* is a portion at which the rotor core 11 and the central region 10A of the rotating shaft 10 engage when the rotating shaft 10 is inserted into the rotor core 11.

The rotor core 11 has a plurality of second through holes 11*d* formed between the outer circumferential surface 11*a* and the first through hole 11*b*. The plurality of second through holes 11*d* are formed at regular intervals in the circumferential direction. In the first embodiment, the number of the plurality of second through holes 11*d* is five. The number of the second through holes 11*d* is not limited to five. For example, the number of the second through holes 11*d* can be changed as appropriate according to a design of the rotary electric machine 1 such as a strength and a weight of the rotor core 11, and a driving force generated by the rotary electric machine 1.

In the first embodiment, the number N of the plurality of electromagnetic steel sheets constituting the rotor core 11 is 47. The number N of electromagnetic steel sheets is not limited to 47. For example, the number N of electromagnetic steel sheets can be changed as appropriate according to a design of the rotary electric machine 1 such as a size in the Z direction and a weight of the rotor core 11, and a driving force generated by the rotary electric machine 1.

In the following description, an electromagnetic steel sheet disposed at a position closest to the front side among the plurality of electromagnetic steel sheets may be referred to as a first electromagnetic steel sheet N1. Also, an electromagnetic steel sheet disposed at a position closest to the rear side among the plurality of electromagnetic steel sheets may be referred to as a 47th electromagnetic steel sheet N47. In a direction from the front side toward the rear side, the electromagnetic steel sheets disposed between the first electromagnetic steel sheet N1 and the 47th electromagnetic steel sheet N47 may be referred to as a second electromagnetic steel sheet N2, a third electromagnetic steel sheet N3, a fourth electromagnetic steel sheet N4, . . . a 44th electromagnetic steel sheet N44, a 45th electromagnetic steel sheet N45, and a 46th electromagnetic steel sheet N46 in order.

The laminated steel sheet of the rotor unit 14 is constituted by the first electromagnetic steel sheet N1 to the 47th electromagnetic steel sheet N47.

Next, a configuration of each of the plurality of electromagnetic steel sheets constituting the rotor core 11 will be described.

The rotor core 11 includes the non-protruding electromagnetic steel sheet 110, the first electromagnetic steel sheet 111, and the second electromagnetic steel sheet 112.

Shapes of the non-protruding electromagnetic steel sheet 110, the first electromagnetic steel sheet 111, and the second electromagnetic steel sheet 112 are substantially regular octagons when viewed in the Z direction.

The term "substantially regular octagon" does not necessarily mean only a geometrically defined regular octagon. The substantially regular octagon has a meaning including a shape in which corner portions of the substantially regular octagon are chamfered, a shape including manufacturing errors, and a substantially regular octagon that partially includes a protruding portion protruding outward in the radial direction, a recessed portion recessed inward in the radial direction, a step, or the like.

Similarly to the configuration of the rotor core 11, the plurality of electromagnetic steel sheets each have the outer circumferential surface 11*a*, the first through hole 11*b*, the engaging recessed portion 11*c*, and the plurality of second through holes 11*d*. Therefore, in the following description, description on the above-described portions, which have been described in the rotor core 11, may be omitted.

<Non-Protruding Electromagnetic Steel Sheet 110>

As shown in FIG. 5, the first electromagnetic steel sheet N1, the second electromagnetic steel sheet N2, the fifth electromagnetic steel sheet N5 to the 43rd electromagnetic steel sheet N43, the 46th electromagnetic steel sheet N46, and the 47th electromagnetic steel sheet N47 are the non-protruding electromagnetic steel sheets 110.

As shown in FIG. 7, the non-protruding electromagnetic steel sheet 110 is an electromagnetic steel sheet different from the first electromagnetic steel sheet 111 and the second electromagnetic steel sheet 112, and is an electromagnetic steel sheet that does not have a protrusion.

The non-protruding electromagnetic steel sheet 110 has eight outer circumferential corner portions 110C and eight linear portions 110L. The non-protruding electromagnetic steel sheet 110 has eight recessed portions 110*a* provided in one-to-one correspondence with the eight outer circumferential corner portions 110C. The recessed portions 110*a* are positioned at the corner portions of the regular octagon.

A shape of each of the recessed portion 110*a* is, for example, semicircular. The semicircular shape is not limited to the shape shown in FIG. 7. A depth of the recessed portion 110*a* recessed inward in the radial direction can be adjusted. A shape of the recessed portion 110*a* is not limited to the semicircular shape with a curvature. The recessed portion 110*a* may have a corner portion or a linear portion extending in a straight line. As a shape of the recessed portion 110*a*, a shape in which at least two of a curved surface portion having a curvature, a corner portion, and a linear portion are combined may be employed. A shape of the recessed portion 110*a* may be, for example, substantially a U shape.

The non-protruding electromagnetic steel sheet 110 is one of the plurality of electromagnetic steel sheets constituting the rotor core 11. Therefore, the non-protruding electromagnetic steel sheet 110 has the first disposition region R1, the second disposition region R2, the third disposition region R3, the fourth disposition region R4, the fifth disposition region R5, the sixth disposition region R6, the seventh disposition region R7, and the eighth disposition region R8.

<First Electromagnetic Steel Sheet 111>

As shown in FIG. 5, the fourth electromagnetic steel sheet N4 and the 44th electromagnetic steel sheet N44 are the first electromagnetic steel sheets 111. In other words, the first electromagnetic steel sheet 111 is disposed in a rear region 11R and a front region 11F of the rotor core 11 in the axial direction. The rear region 11R is an example of a first region. The front region 11F is an example of a second region.

As shown in FIG. 8, the first electromagnetic steel sheet 111 has eight outer circumferential corner portions 111C and eight linear portions 111L. The first electromagnetic steel sheet 111 includes fixed positioning protrusions 111*a* provided in one-to-one correspondence with four outer circumferential corner portions 111C of the eight outer circumferential corner portions 111C, and movable protrusions 111*b* provided in one-to-one correspondence with the remaining four outer circumferential corner portions 111C. That is, the first electromagnetic steel sheet 111 integrally has the four fixed positioning protrusions 111*a* and the four movable protrusions 111*b*. The first electromagnetic steel sheet 111 is an electromagnetic steel sheet that fixes a first magnet 12 serving as one of the plurality of magnets 12. In the following description, the first magnet 12 will be simply referred to as the magnet 12.

In other words, the first electromagnetic steel sheet 111 includes first fixed positioning protrusions 111*a* and first movable protrusions 111*b*. Each of the first fixed positioning protrusions 111*a* positions one end of the first magnet 12 in the circumferential direction and protrudes toward the outside of the first electromagnetic steel sheet 111. Each of the first movable protrusions 111*b* presses the other end of the first magnet 12 in the circumferential direction toward the first fixed positioning protrusion 111*a* and protrudes toward the outside of the first electromagnetic steel sheet 111. In the following description, the first fixed positioning protrusion 111*a* will be simply referred to as the fixed positioning protrusion 111*a*, and the first movable protrusion 111*b* will be simply referred to as the movable protrusion 111*b*.

The four fixed positioning protrusions 111*a* are provided on the first electromagnetic steel sheet 111 at a pitch of 90 degrees in the circumferential direction. Two fixed positioning protrusions 111*a* provided on opposite sides from each other in the radial direction constitute a set of the fixed positioning protrusions. That is, the first electromagnetic steel sheet 111 has two sets of the fixed positioning protrusions.

The four movable protrusions 111*b* are provided on the first electromagnetic steel sheet 111 at a pitch of 90 degrees in the circumferential direction. Two movable protrusions 111*b* provided on opposite sides from each other in the radial direction constitute a set of the movable protrusions. That is, the first electromagnetic steel sheet 111 has two sets of the movable protrusions.

The first electromagnetic steel sheet 111 is one of the plurality of electromagnetic steel sheets constituting the rotor core 11. Therefore, the first electromagnetic steel sheet 111 has the first disposition region R1, the second disposition region R2, the third disposition region R3, the fourth disposition region R4, the fifth disposition region R5, the sixth disposition region R6, the seventh disposition region R7, and the eighth disposition region R8.

<Movable Protrusion 111*b*>

As shown in FIG. 10, the movable protrusion 111*b* extends in the Y direction. The first electromagnetic steel sheet 111 has two recessed portions 111*p* and 111*q* provided on both sides of the movable protrusion 111*b* in the X direction.

Of the two recessed portions 111*p* and 111*q*, a recessed portion provided between the movable protrusion 111*b* and the linear portion 111L extending in the X direction is a first movable orthogonal recessed portion 111*q*.

Of the two recessed portions 111*p* and 111*q*, a recessed portion provided between the movable protrusion 111*b* and the linear portion 111L extending in the first cross direction CR is a first movable diagonal recessed portion 111*p*.

The movable orthogonal recessed portion 111*q* and the first movable diagonal recessed portion 111*p* are notch portions formed on the first electromagnetic steel sheet 111 to extend parallel to each other in the Y direction. The movable orthogonal recessed portion 111*q* has a bottom part 111*s* positioned at an end part of the movable orthogonal recessed portion 111*q*. The first movable diagonal recessed portion 111*p* has a bottom part 111*r* positioned at an end part of the first movable diagonal recessed portion 111*p*.

The movable protrusion 111*b* has an introduction tapered part 111*c* provided on a distal end side of the movable protrusion 111*b*. The introduction tapered part 111*c* faces the fixed positioning protrusion 111*a*. The introduction tapered part 111*c* is a protruding portion that protrudes from the distal end part of the movable protrusion 111*b* toward the fixed positioning protrusion 111*a* in the X direction. When the magnet 12 is attached to the outer circumferential portion 11A of the rotor core 11, the magnet 12 is inserted between the movable protrusion 111*b* and the fixed positioning protrusion 111*a* while coming into contact with the introduction tapered part 111*c*.

A distance between a top part of the introduction tapered part 111*c* and the bottom part 111*r* in the Y direction, that is, a distance between the top part of the introduction tapered part 111*c* and the bottom part 111*s* in the Y direction, is a free end length L1. The free end length L1 is set in consideration of an amount of movement or a range of movement in the circumferential direction when the movable protrusion 111*b* is elastically deformed, and an elastic restoring force of the movable protrusion 111*b*.

The movable protrusion 111*b* has a movable extension surface 111*bx* facing the first movable diagonal recessed portion 111*p*. A distance between a top part of the introduction tapered part 111*c* and the movable extension surface 111*bx* is a width W1 of the movable protrusion 111*b*. The width W1 is set in consideration of workability of the movable protrusion 111*b*. The width W1 is set such that a distance between the magnet 12 adjacent to the movable protrusion 111*b* and the movable protrusion 111*b* does not become large. In the first embodiment, the width W1 is the same as a width W2 of the fixed positioning protrusion 111*a*.

<Fixed Positioning Protrusion 111*a*>

The fixed positioning protrusion 111*a* extends in the Y direction. In the first electromagnetic steel sheet 111, one first fixed extension recessed portion 111*t* is provided adjacent to each of the fixed positioning protrusions 111*a* in the X direction. The first fixed extension recessed portion 111*t* is provided between the fixed positioning protrusion 111*a* and the linear portion 111L extending in the X direction.

The first fixed extension recessed portion 111*t* is a notch portion formed on the first electromagnetic steel sheet 111 to extend in parallel with the Y direction. The first fixed extension recessed portion 111*t* has a bottom part 111*u* positioned at an end part of the first fixed extension recessed portion 111*t*.

The fixed positioning protrusion 111*a* includes a distal end part 111*af*, an inclined end part 111*as*, an inclined part 111*ak*, and a fixed extension surface 111*at*. The distal end part 111*af* is a distal end positioned on an outermost side of the fixed positioning protrusion 111*a* in the Y direction. The inclined part 111*ak* is a surface extending from the distal end part 111*af* to the inclined end part 111*as* in a direction inclined with respect to the Y direction. The fixed extension surface 111*at* is a surface of the fixed positioning protrusion 111*a* positioned on a side opposite to a position at which the first fixed extension recessed portion 111*t* is formed. One end of the inclined part 111*ak* is the distal end part 111*af*, and the other end of the inclined part 111*ak* is the inclined end part 111*as*. In other words, the inclined part 111*ak* is formed between the distal end part 111*af* and the inclined end part 111*as*. The inclined end part 111*as* is formed between the inclined part 111*ak* and the fixed extension surface 111*at*.

A distance between the inclined end part 111*as* and the bottom part 111*u* in the Y direction is a free end length L2. The free end length L2 of the fixed positioning protrusion 111*a* is smaller than the free end length L1 of the movable protrusion 111*b*. Therefore, even if a force from outside the first electromagnetic steel sheet 111 is applied to the fixed positioning protrusion 111*a*, the fixed positioning protrusion 111*a* is hardly deformed.

In other words, since the free end length L1 is larger than the free end length L2, an amount of elastic deformation in the circumferential direction of the movable protrusion 111*b* is larger than that of the fixed positioning protrusion 111*a*.

A width of the fixed positioning protrusion 111*a* in the X direction is the width W2. The width W2 of the fixed positioning protrusion 111*a* is the same as the width W1 of the movable protrusion 111*b*.

The structure of the movable protrusion 111*b* and the fixed positioning protrusion 111*a* shown in FIG. 10 is applied to the first disposition region R1, the third disposition region R3, the fifth disposition region R5, and the seventh disposition region R7.

<Second Electromagnetic Steel Sheet 112>

As shown in FIG. 5, the third electromagnetic steel sheet N3 and the 45th electromagnetic steel sheet N45 are the second electromagnetic steel sheets 112. In other words, the second electromagnetic steel sheet 112 is disposed in the rear region 11R and the front region 11F of the rotor core 11 in the axial direction.

As shown in FIG. 9, the second electromagnetic steel sheet 112 has eight outer circumferential corner portions 112C and eight linear portions 112L. The second electromagnetic steel sheet 112 includes fixed positioning protrusions 112*a* provided in one-to-one correspondence with four outer circumferential corner portions 112C of the eight outer circumferential corner portions 112C, and movable protrusions 112*b* provided in one-to-one correspondence with the remaining four outer circumferential corner portions 112C. That is, the second electromagnetic steel sheet 112 integrally has the four fixed positioning protrusions 112*a* and the four movable protrusions 112*b*. The second electromagnetic steel sheet 112 is an electromagnetic steel sheet that is adjacent to the first magnet 12 in the circumferential direction and fixes the second magnet 12 serving as one of the plurality of magnets 12. In the following description, the second magnet 12 will be simply referred to as the magnet 12.

In other words, the second electromagnetic steel sheet 112 includes second fixed positioning protrusions 112*a* and second movable protrusions 112*b*. Each of the second fixed positioning protrusions 112*a* positions one end of the second magnet 12 in the circumferential direction and protrudes toward the outside of the second electromagnetic steel sheet 112. Each of the second movable protrusions 112*b* presses the other end of the second magnet 12 in the circumferential direction toward the second fixed positioning protrusion 112*a* and protrudes toward the outside of the second electromagnetic steel sheet 112. In the following description, the second fixed positioning protrusion 112*a* will be simply referred to as the fixed positioning protrusion 112*a*, and the second movable protrusion 112*b* will be simply referred to as the movable protrusion 112*b*.

The four fixed positioning protrusions 112*a* are provided on the second electromagnetic steel sheet 112 at a pitch of 90 degrees in the circumferential direction. Two fixed positioning protrusions 112*a* provided on opposite sides from each other in the radial direction constitute a set of the fixed positioning protrusions. That is, the second electromagnetic steel sheet 112 has two sets of the fixed positioning protrusions.

The four movable protrusions 112*b* are provided on the second electromagnetic steel sheet 112 at a pitch of 90 degrees in the circumferential direction. Two movable protrusions 112*b* provided on opposite sides from each other in the radial direction constitute a set of the movable protrusions. That is, the second electromagnetic steel sheet 112 has two sets of the movable protrusions.

The second electromagnetic steel sheet 112 is one of the plurality of electromagnetic steel sheets constituting the rotor core 11. Therefore, the second electromagnetic steel sheet 112 has the first disposition region R1, the second disposition region R2, the third disposition region R3, the fourth disposition region R4, the fifth disposition region R5, the sixth disposition region R6, the seventh disposition region R7, and the eighth disposition region R8.

<Movable Protrusion 112*b*>

As shown in FIG. 11, the movable protrusion 112*b* extends in the first cross direction CR. The second electromagnetic steel sheet 112 has two recessed portions 112*p* and 112*q* provided on both sides of the movable protrusion 112*b* in the second cross direction CS.

Of the two recessed portions 112*p* and 112*q*, a recessed portion provided between the movable protrusion 112*b* and the linear portion 112L extending in the second cross direction CS is a second movable orthogonal recessed portion 112*q*.

Of the two recessed portions 112*p* and 112*q*, a recessed portion provided between the movable protrusion 112*b* and the linear portion 112L extending in the X direction is a second movable diagonal recessed portion 112*p*.

The second movable orthogonal recessed portion 112*q* and the second movable diagonal recessed portion 112*p* are notch portions formed on the second electromagnetic steel sheet 112 to extend in parallel with the first cross direction CR. The second movable orthogonal recessed portion 112*q* has a bottom part 112*s* positioned at an end part of the second movable orthogonal recessed portion 112*q*. The second movable diagonal recessed portion 112*p* has a bottom part 112*r* positioned at an end part of the second movable diagonal recessed portion 112*p*.

The movable protrusion 112*b* has an introduction tapered part 112*c* provided on a distal end side of the movable protrusion 112*b*. The introduction tapered part 112*c* faces the fixed positioning protrusion 112*a*. The introduction tapered part 112*c* is a protruding portion that protrudes from a distal end part of the movable protrusion 112*b* toward the fixed positioning protrusion 112*a* in the second cross direction CS. When the magnet 12 is attached to the outer circumferential portion 11A of the rotor core 11, the magnet 12 is inserted between the movable protrusion 112*b* and the fixed positioning protrusion 112*a* while coming into contact with the introduction tapered part 112*c*.

A distance between a top part of the introduction tapered part 112*c* and the bottom part 112*r* in the first cross direction CR, that is, a distance between the top part of the introduction tapered part 112*c* and the bottom part 112*s* in the first cross direction CR, is a free end length L1. The free end length L1 is set in consideration of an amount of movement or a range of movement in the circumferential direction when the movable protrusion 112*b* is elastically deformed, and an elastic restoring force of the movable protrusion 112*b*.

The movable protrusion 112*b* has a movable extension surface 112*bx* facing the second movable diagonal recessed portion 112*p*. A distance between the top part of the introduction tapered part 112*c* and the movable extension surface 112*bx* is a width W1 of the movable protrusion 112*b*. The width W1 is set in consideration of workability of the movable protrusion 112*b*. The width W1 is set such that a distance between the magnet 12 adjacent to the movable protrusion 112*b* and the movable protrusion 112*b* does not become large. In the first embodiment, the width W1 is the same as a width W2 of the fixed positioning protrusion 112*a*.

<Fixed Positioning Protrusion 112*a*>

The fixed positioning protrusion 112*a* extends in the first cross direction CR. In the second electromagnetic steel sheet 112, one second fixed extension recessed portion 112*t* is provided adjacent to each of the fixed positioning protrusions 112*a* in the second cross direction CS. The second fixed extension recessed portion 112*t* is provided between the fixed positioning protrusion 112*a* and the linear portion 112L extending in the second cross direction CS.

The second fixed extension recessed portion 112*t* is a notch portion formed on the second electromagnetic steel sheet 112 to extend in parallel with the first cross direction CR. The second fixed extension recessed portion 112*t* has a bottom part 112*u* positioned at an end part of the second fixed extension recessed portion 112*t*.

The fixed positioning protrusion 112*a* includes a distal end part 112*af*, an inclined end part 112*as*, an inclined part 112*ak*, and a fixed extension surface 112*at*. The distal end part 112*af* is a distal end positioned on an outermost side of the fixed positioning protrusion 112*a* in the first cross direction CR. The inclined part 112*ak* is a surface extending from the distal end part 112*af* to the inclined end part 112*as* in a direction inclined with respect to the first cross direction CR. The fixed extension surface 112*at* is a surface of the second fixed positioning protrusion 112*a* positioned on a side opposite to a position at which the second fixed extension recessed portion 112*t* is formed. One end of the inclined part 112*ak* is the distal end part 112*af*, and the other end of the inclined part 112*ak* is the inclined end part 112*as*. In other words, the inclined part 112*ak* is formed between the distal end part 112*af* and the inclined end part 112*as*. The inclined end part 112*as* is formed between the inclined part 112*ak* and the fixed extension surface 112*at*.

A distance between the inclined end part 112*as* and the bottom part 112*u* in the first cross direction CR is a free end length L2. The free end length L2 of the fixed positioning protrusion 112*a* is smaller than the free end length L1 of the movable protrusion 112*b*. Therefore, even if a force from outside the second electromagnetic steel sheet 112 is applied to the fixed positioning protrusion 112*a*, the fixed positioning protrusion 112*a* is hardly deformed.

In other words, since the free end length L1 is larger than the free end length L2, an amount of elastic deformation in the circumferential direction of the movable protrusion 112*b* is larger than that of the fixed positioning protrusion 112*a*.

A distance of the fixed positioning protrusion 112*a* in the second cross direction CS is the width W2. The width W2 of the fixed positioning protrusion 112*a* is the same as the width W1 of the movable protrusion 112*b*.

The structure of the movable protrusion 112*b* and the fixed positioning protrusion 112*a* shown in FIG. 11 is applied to the second disposition region R2, the fourth disposition region R4, the sixth disposition region R6, and the eighth disposition region R8.

As shown in FIGS. 3 and 4, in a configuration in which the plurality of electromagnetic steel sheets are laminated in the Z direction, a part of the fixed positioning protrusion 111*a* of the first electromagnetic steel sheet 111 overlaps a part of the movable protrusion 112*b* of the second electromagnetic steel sheet 112. Similarly, a part of the fixed positioning protrusion 112*a* of the second electromagnetic steel sheet 112 overlaps a part of the movable protrusion 111*b* of the first electromagnetic steel sheet 111.

<Laminated Protrusion Constituted by Fixed Positioning Protrusion and Movable Protrusion>

As shown in FIG. 4, in a plan view, the rotor core 11 includes a first laminated protrusion in which the movable protrusion 111*b* and the fixed positioning protrusion 112*a* are overlapped, and a second laminated protrusion in which the fixed positioning protrusion 111*a* and the movable protrusion 112*b* are overlapped. The first laminated protrusion and the second laminated protrusion are symmetrically positioned with respect to a center line CL1. Such a symmetry between the first laminated protrusion and the second laminated protrusion is applied to the first disposition region R1, the third disposition region R3, the fifth disposition region R5, and the seventh disposition region R7.

Similarly, also in the second disposition region R2, the fourth disposition region R4, the sixth disposition region R6, and the eighth disposition region R8, the rotor core 11 includes the first laminated protrusion in which the movable protrusion 111*b* and the fixed positioning protrusion 112*a* are overlapped, and the second laminated protrusion in which the fixed positioning protrusion 111*a* and the movable protrusion 112*b* are overlapped. The first laminated protrusion and the second laminated protrusion are symmetrically positioned with respect to a center line CL2.

<Magnet 12>

The magnet 12 is a Nd—Fe—B based sintered magnet. A surface of the magnet 12 is coated with rust-preventive plating or the like. The magnet 12 has one cylindrical surface 12*a* extending in the Z direction, a flat surface 12*b* positioned on a side opposite to the cylindrical surface 12*a*, and two side surfaces 12*c* and 12*d*.

For example, as shown in FIG. 12, if the flat surface 12*b* is in parallel with the X direction, the side surface 12*c* of the magnet 12 is positioned at one end in the X direction, and the side surface 12*d* of the magnet 12 is positioned at the other end in the X direction. In this case, the cylindrical surface 12*a* has a shape that bulges in the Y direction. A shape of the magnet 12 is such that the cylindrical surface 12*a* has a shape corresponding to a part of a curved surface of a semi-cylindrical shape. In other words, the cylindrical surface 12*a* has a shape corresponding to a part of a curved surface of a half-moon shape. The plurality of magnets 12 are disposed in the circumferential direction.

A distance between the two side surfaces 12*c* and 12*d* is designed to be slightly larger than a distance between the fixed positioning protrusion 111*a* and the movable protrusion 111*b*, and a distance between the fixed positioning protrusion 112*a* and the movable protrusion 112*b*.

As shown in FIG. 13, the magnets 12 are each disposed in the first disposition region R1, the second disposition region R2, the third disposition region R3, the fourth disposition region R4, the fifth disposition region R5, the sixth disposition region R6, the seventh disposition region R7, and the eighth disposition region R8. In other words, a plurality of first magnets and a plurality of second magnets are disposed alternately in the circumferential direction.

In the first disposition region R1, the third disposition region R3, the fifth disposition region R5, and the seventh disposition region R7, the magnet 12 is positioned and fixed between the movable protrusion 111*b* and the fixed positioning protrusion 111*a*. In such a fixed state, an elastic restoring force is generated in the movable protrusion 111*b*, and the magnet 12 is fixed between the movable protrusion 111*b* and the fixed positioning protrusion 111*a* by the elastic restoring force. Such fixing of the magnet 12 is performed at the first electromagnetic steel sheets 111 corresponding to the fourth electromagnetic steel sheet N4 and the 44th electromagnetic steel sheet N44 shown in FIG. 5. In other words, the magnets 12 are fixed at two locations on the front side and the rear side in the axial direction in the first disposition region R1, the third disposition region R3, the fifth disposition region R5, and the seventh disposition region R7.

In the second disposition region R2, the fourth disposition region R4, the sixth disposition region R6, and the eighth disposition region R8, the magnet 12 is positioned and fixed between the movable protrusion 112*b* and the fixed positioning protrusion 112*a*. In such a fixed state, an elastic restoring force is generated in the movable protrusion 112*b*, and the magnet 12 is fixed between the movable protrusion 112*b* and the fixed positioning protrusion 112*a* by the elastic restoring force. Such fixing of the magnet 12 is performed at the second electromagnetic steel sheets 112 corresponding to the third electromagnetic steel sheet N3 and the 45th electromagnetic steel sheet N45 shown in FIG. 5. In other words, the magnets 12 are fixed at two locations on the front side and the rear side in the second disposition region R2, the fourth disposition region R4, the sixth disposition region R6, and the eighth disposition region R8.

<Method of Assembling Rotor Unit 14>

Next, a method of assembling the rotor unit 14 will be described.

As will be described later, the method of assembling the rotor unit 14 includes a step of applying an adhesive, a step of attaching the magnet, a step of curing the adhesive, a step of attaching the protective tube, and a step of press-fitting the rotating shaft.

<Step of Applying Adhesive>

The step of applying an adhesive is performed before the magnet 12 is attached to the rotor core 11.

First, an adhesive is applied to the outer circumferential surface 11*a* of the rotor core 11. The adhesive is, for example, a thermosetting type silicone-based adhesive or a two-component curing type acrylic-based adhesive.

Before the adhesive is cured, the next step of applying an adhesive is performed.

<Step of Attaching Magnet>

First, attachment of the magnet using the movable protrusion 111*b* and the fixed positioning protrusion 111*a* will be described. The magnet 12 is pressed against the outer circumferential surface 11*a* from outside of the rotor core 11, and the magnet 12 is inserted between the movable protrusion 111*b* and the fixed positioning protrusion 111*a*. At this time, the movable protrusion 111*b* is elastically deformed while the magnet 12 comes into contact with the introduction tapered part 111*c* formed on the movable protrusion 111*b*, and the magnet 12 is inserted between the movable protrusion 111*b* and the fixed positioning protrusion 111*a* to be fixed.

In such a fixed state, the magnet 12 is in close contact with the outer circumferential surface 11*a* of the rotor core 11, and the magnet 12 is pressed against the fixed positioning protrusion 111*a* by the elastic restoring force of the movable protrusion 111*b*. Such work is performed in the first disposition region R1, the third disposition region R3, the fifth disposition region R5, and the seventh disposition region R7, and in the fourth electromagnetic steel sheet N4 and the 44th electromagnetic steel sheet N44.

Next, attachment of the magnet using the movable protrusion 112*b* and the fixed positioning protrusion 112*a* will be described. The magnet 12 is pressed against the outer circumferential surface 11*a* from outside of the rotor core 11, and the magnet 12 is inserted between the movable protrusion 112*b* and the fixed positioning protrusion 112*a*. At this time, the movable protrusion 112*b* is elastically deformed while the magnet 12 comes into contact with the introduction tapered part 112*c* formed on the movable protrusion 112*b*, and the magnet 12 is inserted between the movable protrusion 112*b* and the fixed positioning protrusion 112*a* to be fixed.

In such a fixed state, the magnet 12 is in close contact with the outer circumferential surface 11*a* of the rotor core 11, and the magnet 12 is pressed against the fixed positioning protrusion 112*a* by the elastic restoring force of the movable protrusion 112*b*. Such work is performed in the second disposition region R2, the fourth disposition region R4, the sixth disposition region R6, and the eighth disposition region R8, and in the third electromagnetic steel sheet N3 and the 45th electromagnetic steel sheet N45.

Therefore, positions of the plurality of magnets 12 on the eight outer circumferential surfaces 11*a* of the rotor core 11 are maintained.

<Step of Curing Adhesive>

Next, the adhesive is cured. Therefore, the plurality of magnets 12 are fixed with high accuracy on the eight outer circumferential surfaces 11*a* of the rotor core 11.

<Step of Attaching Protective Tube>

The protective tube 13 is formed on an outer side of the magnet 12 fixed to the rotor core 11 by deep drawing. Specifically, the protective tube 13 is fixed such that the magnet 12 is press-fitted into the protective tube 13. Thereafter, an end surface of the protective tube 13 is bent. Therefore, the protective tube 13 is in contact with and fixed to the front side and the rear side of the rotor core 11.

<Step of Press-Fitting Rotating Shaft>

Finally, the rotating shaft 10 is press-fitted into the first through hole 11*b* of the rotor core 11. Therefore, the rotor unit 14 is completed.

Further, in the method of assembling the rotor unit 14 described above, the rotating shaft 10 has been press-fitted and fixed after the magnet 12 is fixed to the rotor core 11. The first embodiment is not limited to such steps. After the rotating shaft 10 is press-fitted into the rotor core 11 and fixed, the step of applying an adhesive, the step of attaching the magnet, the step of curing the adhesive, and the step of attaching the protective tube described above may be performed.

<Effects of First Embodiment>

According to the first embodiment, the plurality of magnets are each fixed by the first electromagnetic steel sheet 111 and the second electromagnetic steel sheet 112. That is, the magnets 12 adjacent to each other are fixed by separate electromagnetic steel sheets. Therefore, it is not necessary to dispose a fixed positioning protrusion and a movable protrusion side by side between magnets adjacent to each other as in conventional rotary electric machines. That is, a distance between the magnets 12 can be configured to be reduced, and it is possible to provide the rotary electric machine 1 that is small in size and has a high drive efficiency.

Also, a part of the fixed positioning protrusion 111*a* of the first electromagnetic steel sheet 111 overlaps a part of the movable protrusion 112*b* of the second electromagnetic steel sheet 112. Similarly, a part of the fixed positioning protrusion 112*a* of the second electromagnetic steel sheet 112 overlaps a part of the movable protrusion 111*b* of the first electromagnetic steel sheet 111.

Therefore, a distance in the circumferential direction between two of the plurality of magnets 12 adjacent to each other can be reduced. It is possible to realize the rotary electric machine 1 that is small in size and has a high drive efficiency by effectively using the magnetic force.

Also, since the first electromagnetic steel sheet 111 and the second electromagnetic steel sheet 112 are both disposed on the front side and the rear side in the Z direction of the rotor core 11, the magnets 12 are not inclined with respect to the axial direction, and the magnets 12 can be disposed with higher accuracy.

Further, in conventional rotary electric machines, a fixed positioning protrusion and a movable positioning protrusion are disposed at the left and right of a magnet, but a shape of the fixed positioning protrusion and a shape of the movable positioning protrusion are different from each other. In this case, a distribution of a magnetic flux density of a magnetic force generated at a left end of the magnet and a distribution of a magnetic flux density of a magnetic force generated at a right end of the magnet are unbalanced. Due to such imbalance in distribution of the magnetic flux density, there is a problem in that motor characteristics such as a cogging torque deteriorates.

In contrast to such a conventional rotary electric machine, in the rotor core 11 according to the first embodiment, the first laminated protrusion in which the movable protrusion 111*b* and the fixed positioning protrusion 112*a* are overlapped and the second laminated protrusion in which the fixed positioning protrusion 111*a* and the movable protrusion 112*b* are overlapped are symmetrically disposed with respect to the center lines CL1 and CL2.

Therefore, a magnetic force is generated in a well-balanced manner at a left end and a right end of the magnet 12, and a balanced distribution of the magnetic flux density can be obtained at the left end and the right end of the magnet 12.

Therefore, the unbalanced distribution of the magnetic flux density as in conventional rotary electric machines does not occur, and satisfactory motor characteristics can be obtained.

Also, the width W1 of the movable protrusion 111*b* is larger than the width W2 of the fixed positioning protrusion 111*a*. The width W1 of the movable protrusion 112*b* is larger than the width W2 of the fixed positioning protrusion 112*a*. Further, the free end length L1 of the movable protrusion 111*b* is larger than the free end length L2 of the fixed positioning protrusion 111*a*. The free end length L1 of the movable protrusion 112*b* is larger than the free end length L2 of the fixed positioning protrusion 112*a*.

Therefore, processing of the first electromagnetic steel sheet 111 and the second electromagnetic steel sheet 112 is facilitated, and it is possible to configure the movable protrusions 111*b* and 112*b* with satisfactory spring characteristics.

Therefore, the magnet 12 can be reliably pressed against the fixed positioning protrusions 111*a* and 112*a*, a high disposition accuracy of the magnet 12 with respect to the outer circumferential surface 11*a* can be obtained, and thereby it is possible to provide the rotary electric machine 1 having satisfactory characteristics in which generation of a torque ripple or a cogging torque is suppressed.

In the method of assembling the rotor unit 14, a temporary holding jig for curing the adhesive used to adhere the magnet 12 is not necessary, and there is no work for attaching or removing the temporary holding jig. Therefore, it is possible to provide the rotary electric machine 1 that is also excellent in assembly workability.

Next, two modified examples of the first embodiment, a second embodiment, a modified example of the second embodiment, and a third embodiment will be described.

In the following description, members the same as those in the first embodiment will be denoted by the same reference numerals, and description thereof will be omitted or simplified.

Modified Example 1 of First Embodiment

In the first embodiment described above, the first electromagnetic steel sheet 111 has been employed as the fourth electromagnetic steel sheet N4 and the 44th electromagnetic steel sheet N44. The second electromagnetic steel sheet 112 has been employed as the third electromagnetic steel sheet N3 and the 45th electromagnetic steel sheet N45. The other electromagnetic steel sheets have been non-protruding electromagnetic steel sheets 110. Therefore, the magnets 12 have been fixed at two locations on the front side and the rear side in the axial direction.

In the rotor core 11, positions at which the first electromagnetic steel sheet 111, the second electromagnetic steel sheet 112, and the non-protruding electromagnetic steel sheet 110 are employed may be changed as appropriate. Also, the number of the first electromagnetic steel sheets 111, the number of the second electromagnetic steel sheets 112, and the number of the non-protruding electromagnetic steel sheets 110 may also be changed as appropriate.

Figure 14A:
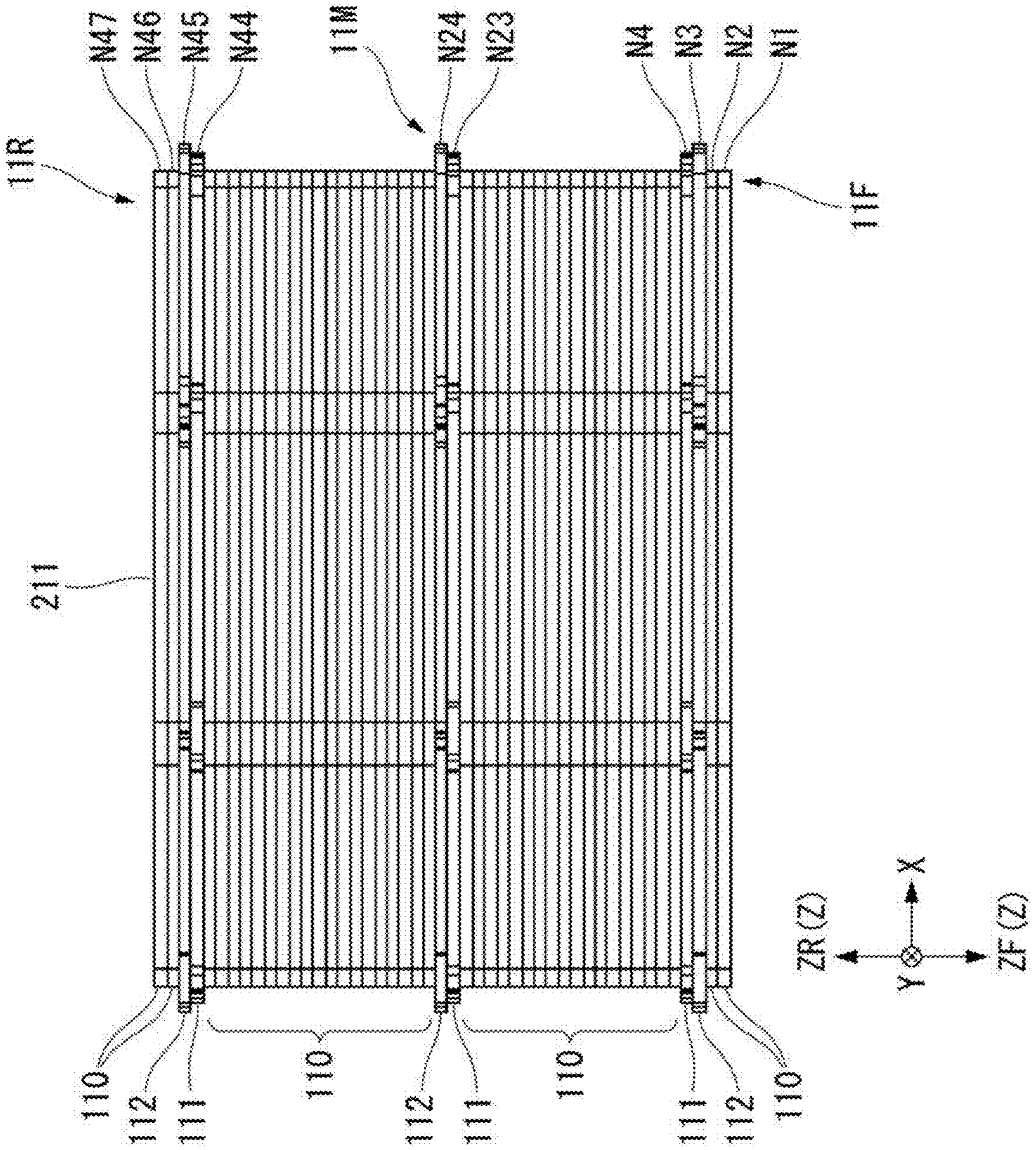
FIG. 14A is a front view showing a rotor core according to modified example 1 of the first embodiment.

FIG. 14A is a front view showing the rotor core 11 according to modified example 1 of the first embodiment.

In the present modified example, the first electromagnetic steel sheet 111 is employed as the 23rd electromagnetic steel sheet N23, and the second electromagnetic steel sheet 112 is employed as the 24th electromagnetic steel sheet N24 in addition to the configuration of the first embodiment. The 23rd electromagnetic steel sheet N23 and the 24th electromagnetic steel sheet N24 correspond to a central region 11M of the rotor core 11 in the axial direction. The central region 11M is a region between the rear region 11R and the front region 11F. In other words, a region between the first region and the second region is the central region 11M.

That is, the magnets 12 are fixed at three locations in the axial direction at three first electromagnetic steel sheets 111 corresponding to the fourth electromagnetic steel sheet N4, the 23rd electromagnetic steel sheet N23, and the 44th electromagnetic steel sheet N44.

Similarly, the magnets 12 are fixed at three locations in the axial direction at three second electromagnetic steel sheets 112 corresponding to the third electromagnetic steel sheet N3, the 24th electromagnetic steel sheet N24, and the 45th electromagnetic steel sheet N45.

As shown in FIG. 14A, a degree of ease of inserting the magnet 12 between the movable protrusion and the fixed positioning protrusion can be adjusted by disposing the first electromagnetic steel sheet 111 and the second electromagnetic steel sheet 112 in the central region 11M Further, a holding force for holding the magnet 12 can be adjusted by the movable protrusion and the fixed positioning protrusion.

Modified Example 2 of First Embodiment

Also, in the first embodiment described above, the number of magnets 12 is eight, and a shape of the rotor core 11 is a substantially regular octagonal prism shape. In the first embodiment, the number of magnets 12 is not limited, nor is the shape of the rotor core 11 limited.

Figure 14B:
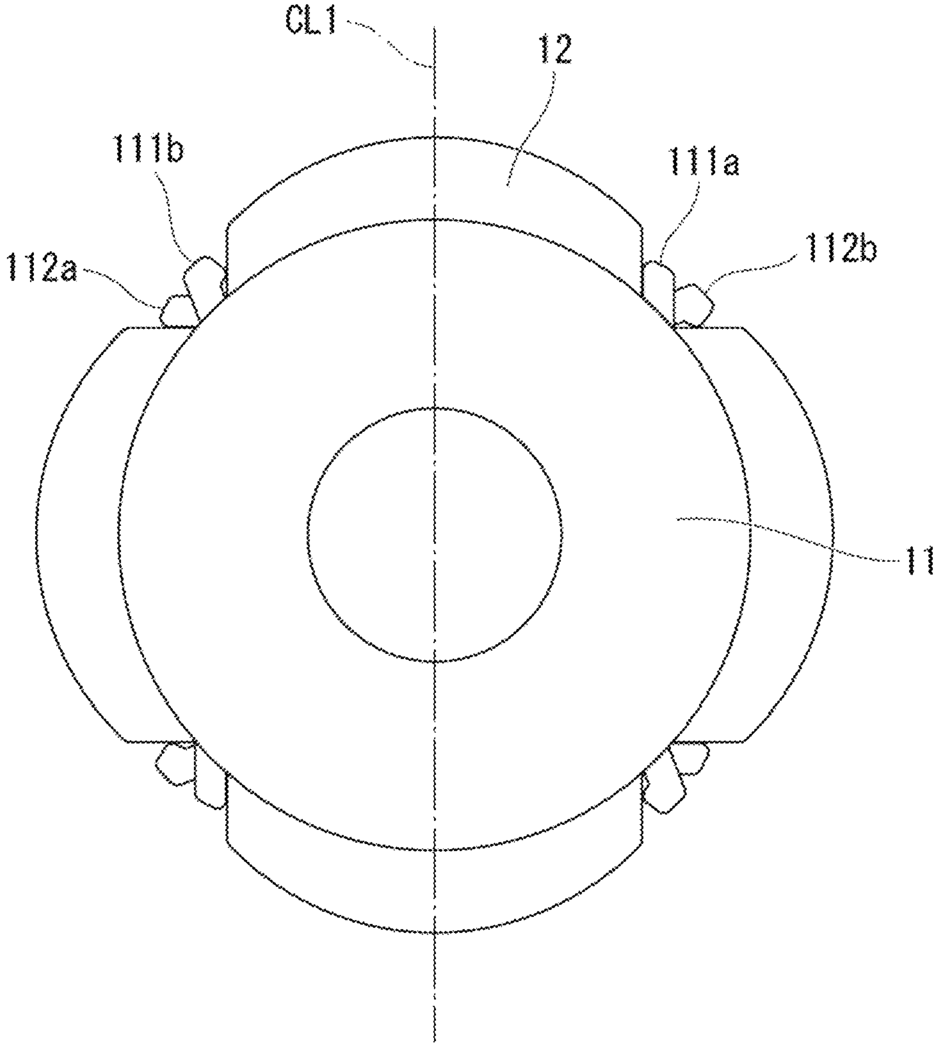
FIG. 14B is a top view showing a rotor core according to modified example 2 of the first embodiment.

FIG. 14B is a top view showing the rotor core 11 according to modified example 2 of the first embodiment.

As shown in FIG. 14B, in the rotor core 11 according to the present modified example, a cylindrical rotor using a segment-shaped magnet 12 is employed. In this structure, the segment-shaped magnet 12 is disposed between the movable protrusion 111*b* and the fixed positioning protrusion 111*a*. Similarly, the segment-shaped magnet 12 is disposed between the movable protrusion 112*b* and the fixed positioning protrusion 112*a*.

As described above, the same effects as those in the first embodiment can be obtained also in the configuration in which the segment-shaped magnet 12 is fixed to the cylindrical rotor.

Second Embodiment

Figure 15:
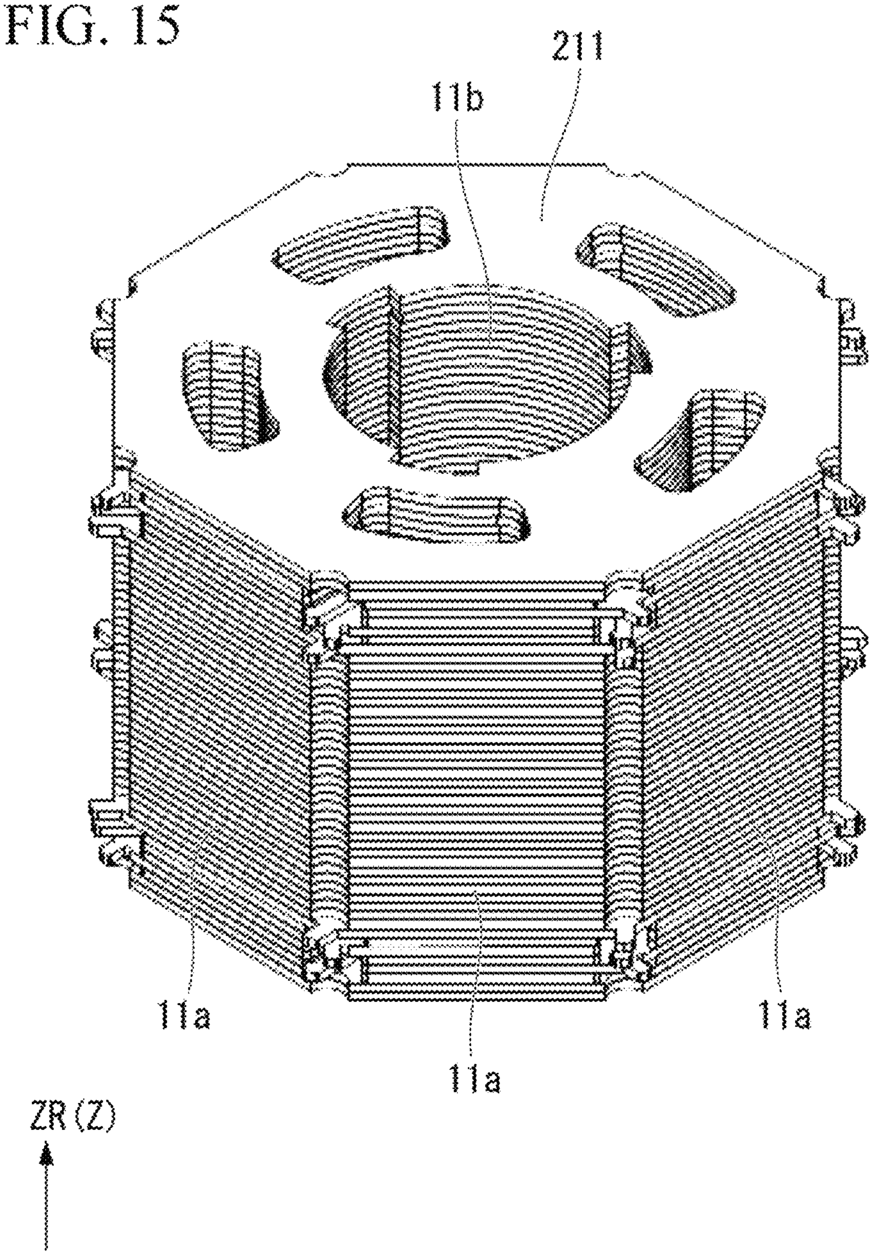
FIG. 15 is a perspective view showing a rotor core according to a second embodiment.
Figure 16:
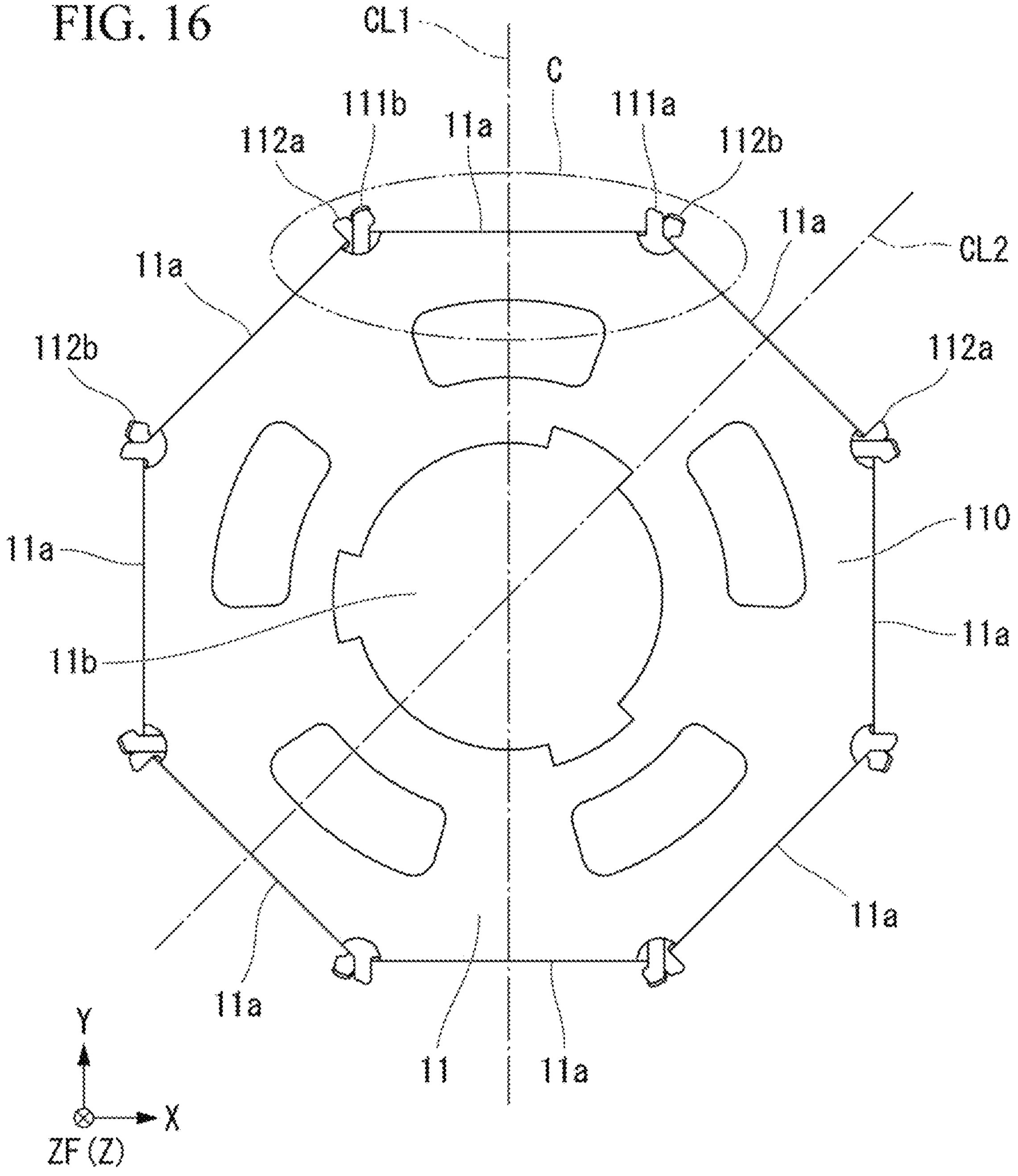
FIG. 16 is a top view showing the rotor core according to the second embodiment.
Figure 17:
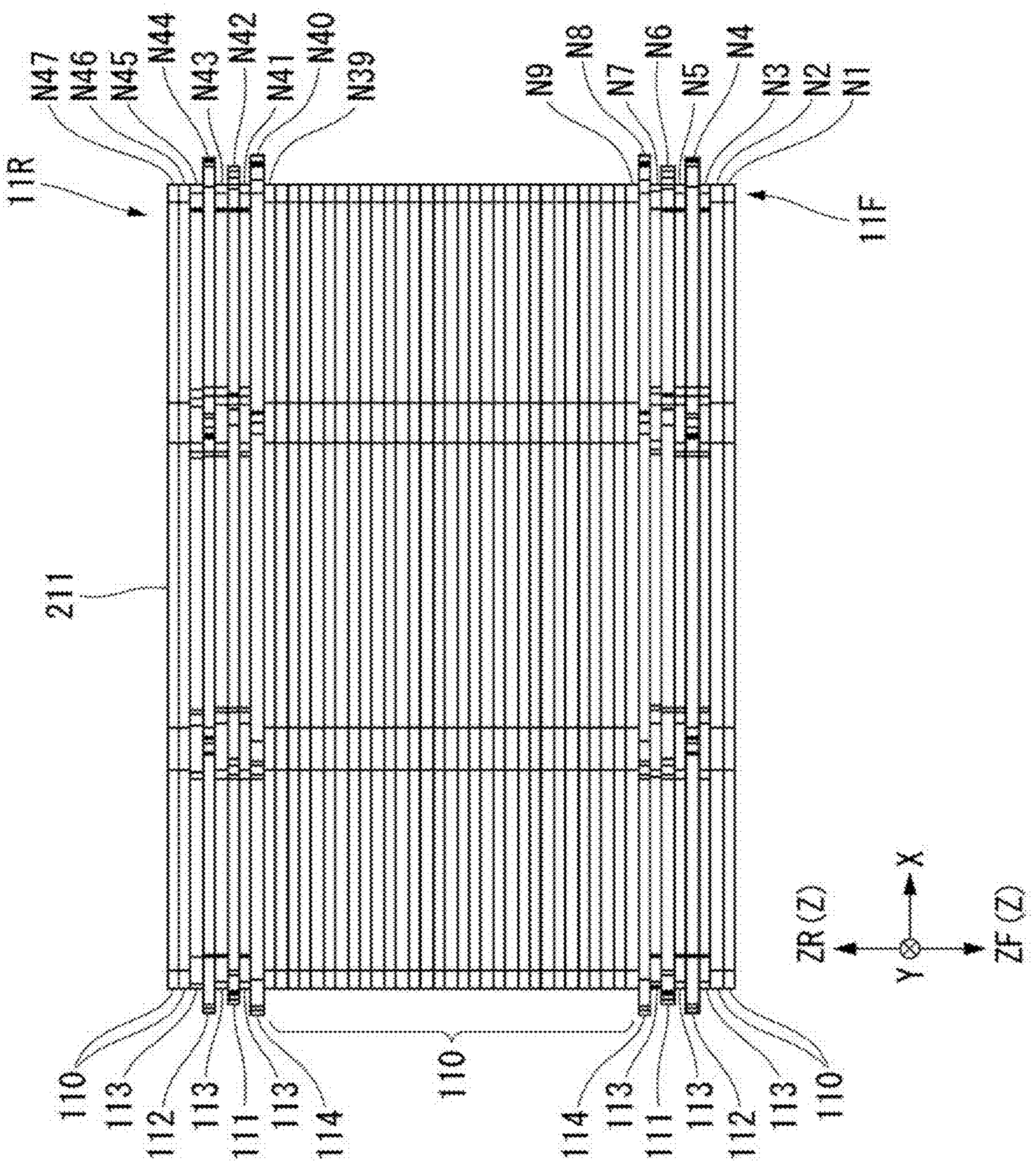
FIG. 17 is a front view showing the rotor core according to the second embodiment.
Figure 18:
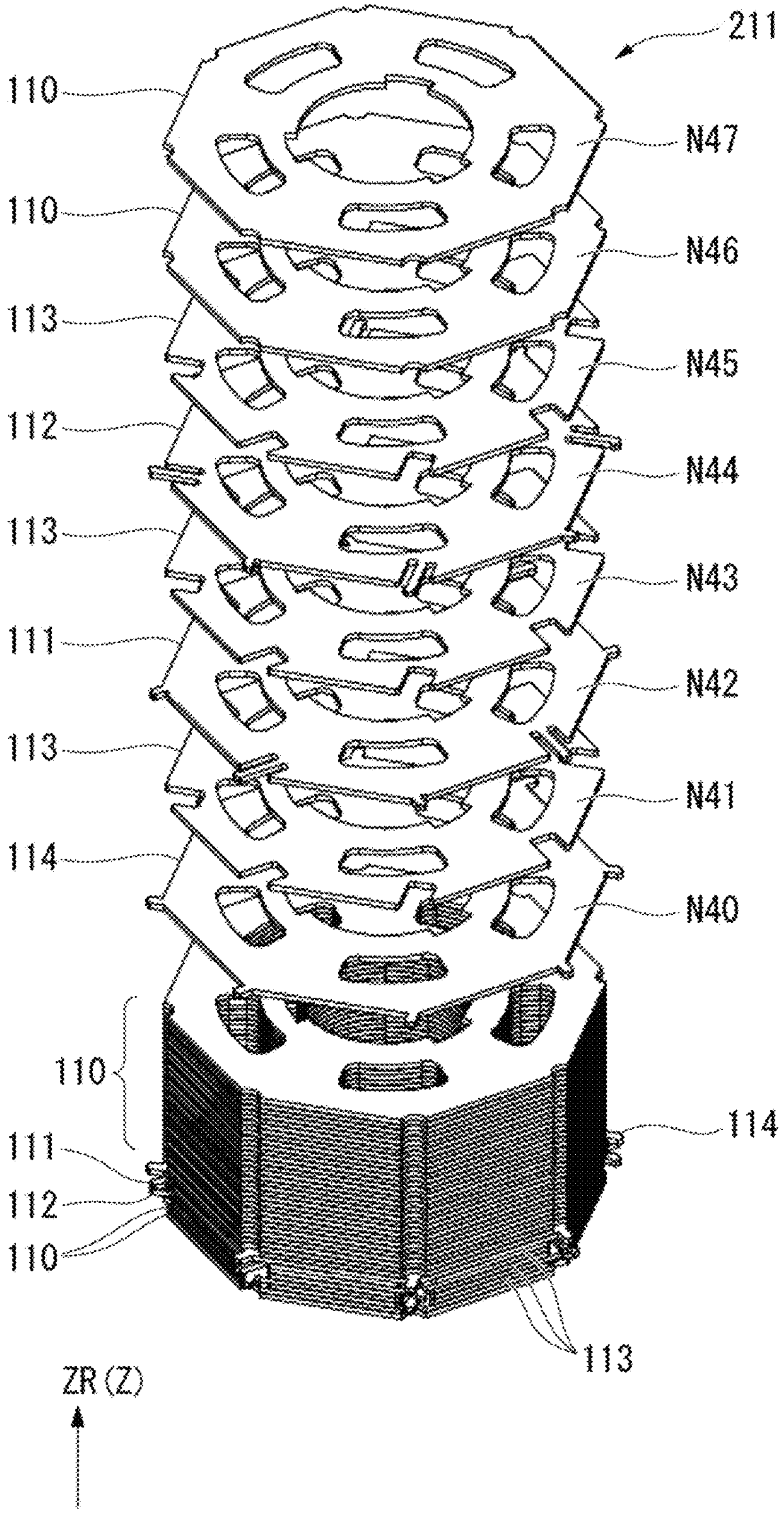
FIG. 18 is a partially exploded view showing the rotor core according to the second embodiment.
Figure 19:
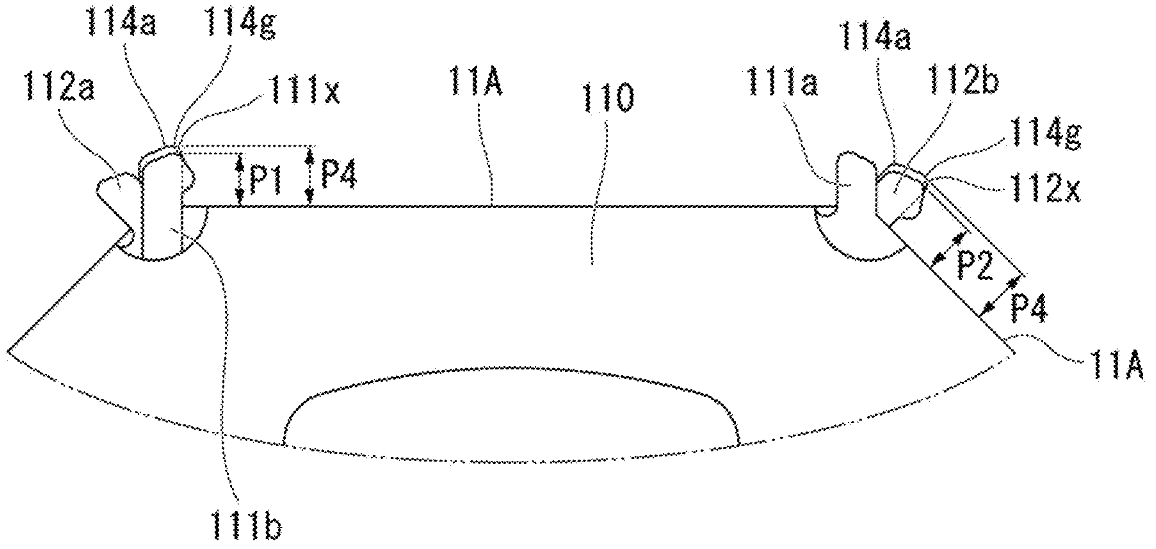
FIG. 19 is a view showing the rotor core according to the second embodiment, and is an enlarged view showing the portion indicated by reference letter C in FIG. 16.
Figure 20:
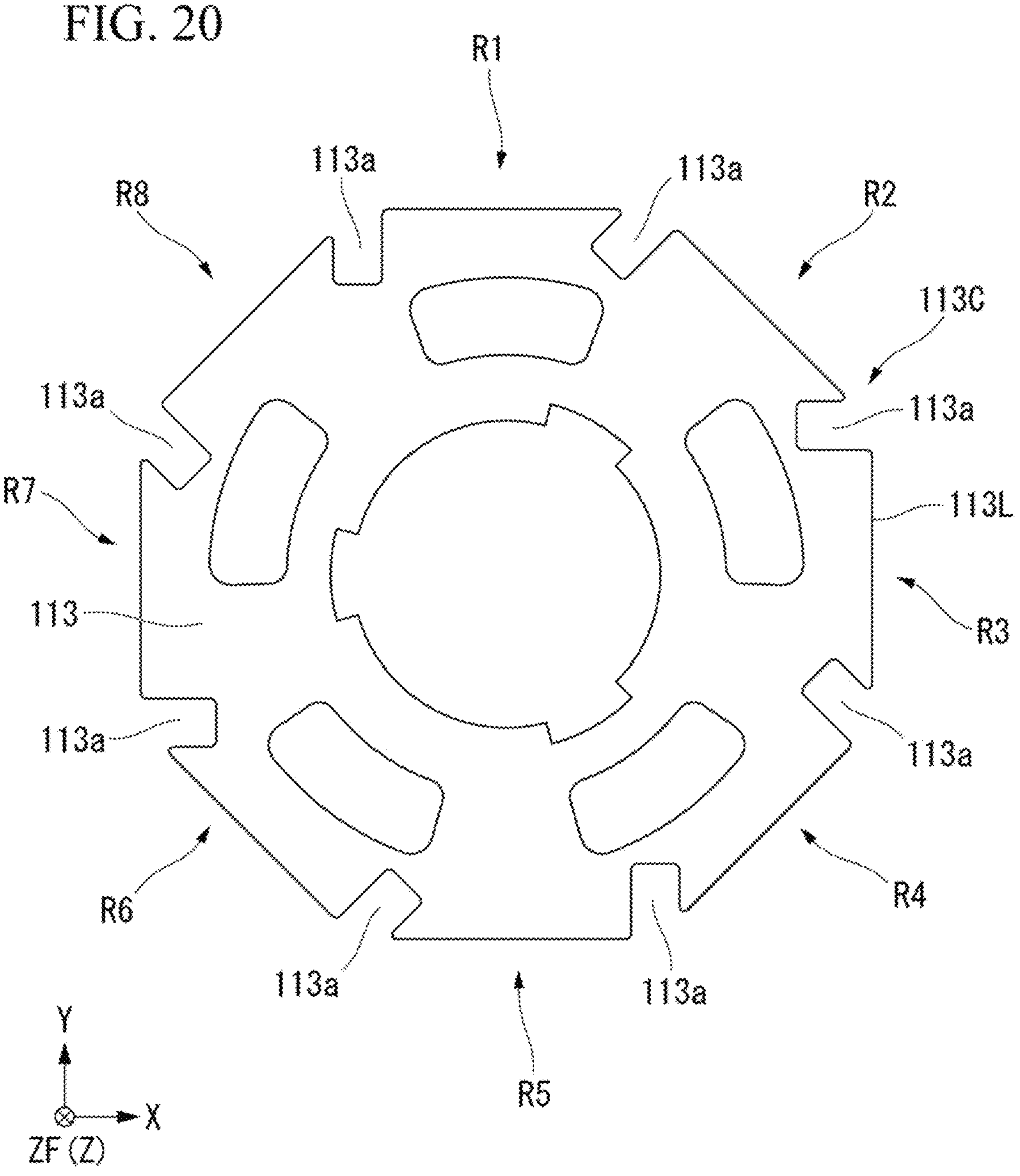
FIG. 20 is a top view showing a third electromagnetic steel sheet according to the second embodiment.
Figure 21:
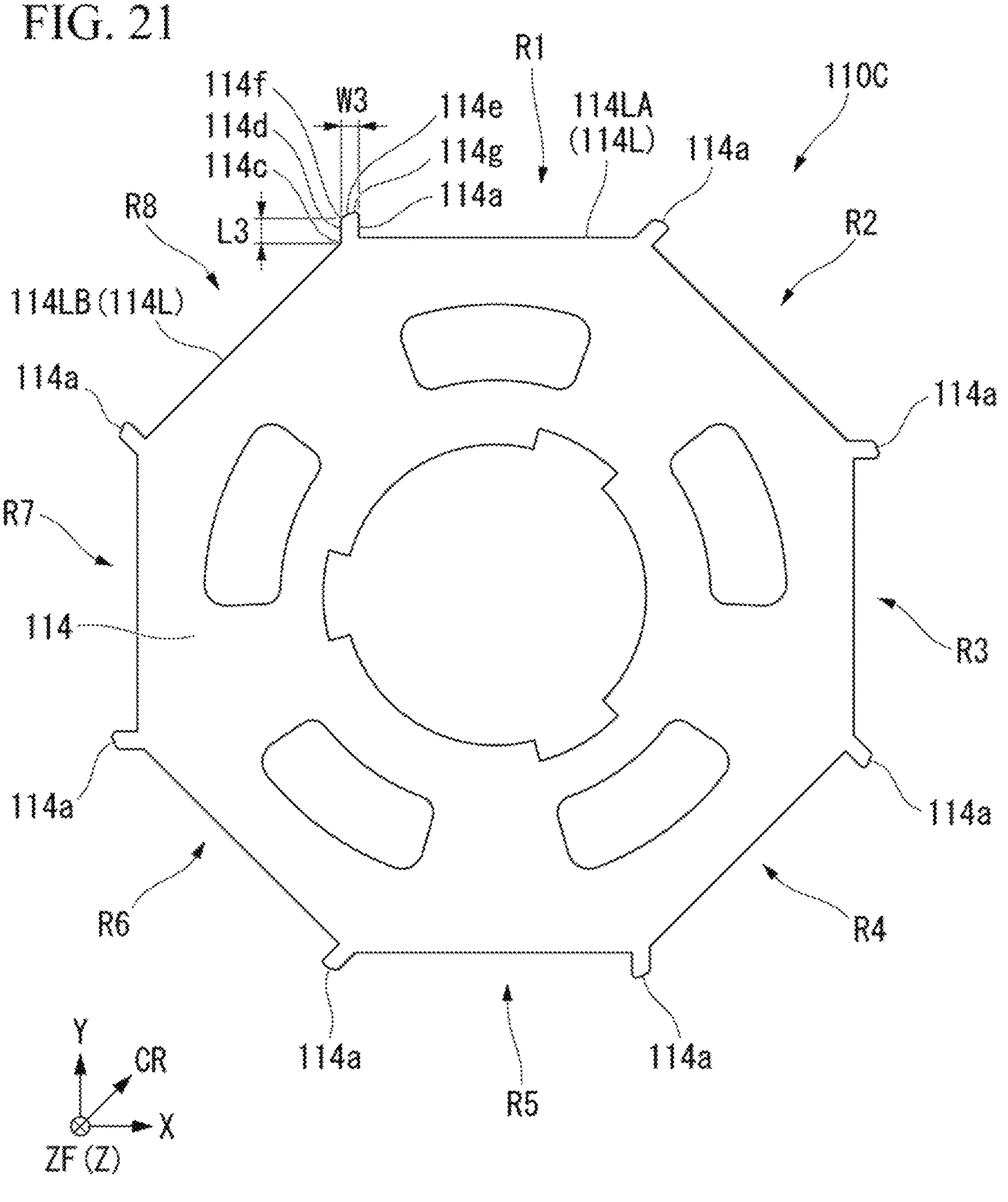
FIG. 21 is a top view showing a fourth electromagnetic steel sheet according to the second embodiment.

A configuration of a rotor core 11 according to a second embodiment will be described with reference to FIGS. 15 to 21. FIG. 15 is a perspective view showing the rotor core. FIG. 16 is a top view showing the rotor core. FIG. 17 is a front view showing the rotor core. FIG. 18 is a partially exploded view showing the rotor core. FIG. 19 is a view showing the rotor core, and is an enlarged view showing the portion indicated by reference letter C in FIG. 16. FIG. 20 is a top view showing a third electromagnetic steel sheet. FIG. 21 is a top view showing a fourth electromagnetic steel sheet.

A rotor core 211 includes the non-protruding electromagnetic steel sheet 110, the first electromagnetic steel sheet 111, and the second electromagnetic steel sheet 112 described in the first embodiment. Further, the rotor core 211 includes a third electromagnetic steel sheet 113 and a fourth electromagnetic steel sheet 114. The rotor core 211 is an example of a laminated steel sheet in which a plurality of electromagnetic steel sheets are laminated in a Z direction.

As shown in FIGS. 17 and 18, a first electromagnetic steel sheet N1, a second electromagnetic steel sheet N2, a ninth electromagnetic steel sheet N9 to a 39th electromagnetic steel sheet N39, a 46th electromagnetic steel sheet N46, and a 47th electromagnetic steel sheet N47 are the non-protruding electromagnetic steel sheets 110. A fourth electromagnetic steel sheet N4 and a 42nd electromagnetic steel sheet N42 are the first electromagnetic steel sheets 111. A sixth electromagnetic steel sheet N6 and a 44th electromagnetic steel sheet N44 are the second electromagnetic steel sheets 112. A third electromagnetic steel sheet N3, a fifth electromagnetic steel sheet N5, a seventh electromagnetic steel sheet N7, a 41st electromagnetic steel sheet N41, a 43rd electromagnetic steel sheet N43, and a 45th electromagnetic steel sheet N45 are the third electromagnetic steel sheets 113. An eighth electromagnetic steel sheet N8 and a 40th electromagnetic steel sheet N40 are the fourth electromagnetic steel sheets 114.

<Third Electromagnetic Steel Sheet 113>

As shown in FIG. 20, the third electromagnetic steel sheet 113 is one of the plurality of electromagnetic steel sheets constituting the rotor core 211. Therefore, the non-protruding electromagnetic steel sheet 110 has a first disposition region R1, a second disposition region R2, a third disposition region R3, a fourth disposition region R4, a fifth disposition region R5, a sixth disposition region R6, a seventh disposition region R7, and an eighth disposition region R8.

The third electromagnetic steel sheet 113 is a different electromagnetic steel sheet from the first electromagnetic steel sheet 111, the second electromagnetic steel sheet 112, and the fourth electromagnetic steel sheet 114, and is an electromagnetic steel sheet without a protrusion.

The third electromagnetic steel sheet 113 has eight outer circumferential corner portions 113C and eight linear portions 113L. The third electromagnetic steel sheet 113 has eight notch portions 113*a* provided in one-to-one correspondence with the eight outer circumferential corner portions 113C. The notch portions 113*a* are positioned at corner portions of the regular octagon.

In an axial direction, a position of the notch portion 113*a* coincides with that of a movable protrusion 111*b* of the first electromagnetic steel sheet 111 and a movable protrusion 112*b* of the second electromagnetic steel sheet 112. That is, the notch portion 113*a* is formed such that the third electromagnetic steel sheet 113 does not overlap the movable protrusions 111*b* and 112.

A shape of the notch portion 113*a* is, for example, a substantially U shape having a corner portion. The shape of the notch portion 113*a* is not limited to the shape shown in FIG. 20. A depth in a direction in which the notch portion 113*a* extends, that is, in a depth direction of the U shape, can be adjusted. A shape of the recessed portion 110*a* is not limited to the U shape. As long as it is possible to avoid contact between the movable protrusions 111*b* and 112*b* and the third electromagnetic steel sheet 113, a shape of the notch portion 113*a* is selected as appropriate.

In other words, in the axial direction of a rotating shaft 10, the third electromagnetic steel sheet 113 is disposed between the first electromagnetic steel sheet 111 and the second electromagnetic steel sheet 112. The third electromagnetic steel sheet 113 is in contact with the first electromagnetic steel sheet 111 and the second electromagnetic steel sheet 112. When viewed in the axial direction, the notch portion 113*a* does not overlap the first movable protrusion 111*b* of the first electromagnetic steel sheet 111 and the second movable protrusion 112*b* of the second electromagnetic steel sheet 112.

<Fourth Electromagnetic Steel Sheet 114>

As shown in FIG. 21, the fourth electromagnetic steel sheet 114 is one of the plurality of electromagnetic steel sheets constituting the rotor core 211. Therefore, the non-protruding electromagnetic steel sheet 110 has the first disposition region R1, the second disposition region R2, the third disposition region R3, the fourth disposition region R4, the fifth disposition region R5, the sixth disposition region R6, the seventh disposition region R7, and the eighth disposition region R8.

The fourth electromagnetic steel sheet 114 includes eight outer circumferential corner portions 114C and eight linear portions 114L. The fourth electromagnetic steel sheet 114 has eight guide protrusions 114*a* provided in one-to-one correspondence with the eight outer circumferential corner portions 114C. The guide protrusions 114*a* are positioned at corner portions of the regular octagon. In other words, the guide protrusions 114*a* are disposed apart from each other in a circumferential direction. The fourth electromagnetic steel sheet 114 integrally has a plurality of guide protrusions 114*a* spaced apart in the circumferential direction.

<Guide Protrusion 114*a*>

In the following description, a structure of the guide protrusion 114*a* in the first disposition region R1 will be described. The other disposition regions R2 to R8 have the same structure as the first disposition region R1, and description thereof will be omitted.

The guide protrusion 114*a* is provided between a first linear portion 114LA and a second linear portion 114 LB which correspond to two linear portions 114L adjacent to each other.

The guide protrusion 114*a* protrudes to the outside of the fourth electromagnetic steel sheet 114 in a direction orthogonal to the first linear portion 114LA. In other words, the guide protrusion 114*a* protrudes toward the outside of the fourth electromagnetic steel sheet 114.

Specifically, the guide protrusion 114*a* includes a connection part 114*c*, a vertical extension part 114*d*, an inclined part 114*e*, an inclined end part 114*f*, and a distal end part 114*g*. The connection part 114*c* is a portion in which the second linear portion 114LB and the guide protrusion 114*a* are connected. The vertical extension part 114*d* is a portion extending in a direction orthogonal to the first linear portion 114LA from the connection part 114*c*. The distal end part 114*g* is a distal end positioned on an outermost side of the guide protrusion 114*a* in a direction orthogonal to the first linear portion 114LA. The inclined part 114*e* is connected to the vertical extension part 114*d* at the inclined end part 114*f* and extends in a direction inclined with respect to the linear portion 114L. The inclined part 114*e* is provided between the inclined end part 114*f* and the distal end part 114*g*.

A distance between the connection part 114*c* and the inclined end part 114*f* in a direction orthogonal to the first linear portion 114LA is a free end length L3. A width of the guide protrusion 114*a* in a direction parallel to the first linear portion 114LA is a width W3. The free end length L3 is smaller than the free end length L1. The width W3 is larger than the width W1. Therefore, the guide protrusion 114*a* has a structure that is less likely to be deformed by an external force than the movable protrusions 111*b* and 112*b*.

As shown in the left part of FIG. 19, the guide protrusion 114*a* is disposed to overlap the movable protrusion 111*b* of the first electromagnetic steel sheet 111. Specifically, the guide protrusion 114*a* protrudes in a direction perpendicular to an outer circumferential portion 11A. The movable protrusion 111*b* also protrudes in a direction perpendicular to the outer circumferential portion 11A. A distance between the outer circumferential portion 11A and the distal end part 114*g* of the guide protrusion 114*a* is P4. A distance between the outer circumferential portion 11A and a distal end part 111*x* of the movable protrusion 111*b* is P1. The distance P4 is either the same as the distance P1 or larger than the distance P1.

As shown in the right part of FIG. 19, the guide protrusion 114*a* is disposed to overlap the movable protrusion 112*b* of the second electromagnetic steel sheet 112. Specifically, the guide protrusion 114*a* protrudes in a direction perpendicular to the outer circumferential portion 11A. The movable protrusion 112*b* also protrudes in a direction perpendicular to the outer circumferential portion 11A. A distance between the outer circumferential portion 11A and the distal end part 114*g* of the guide protrusion 114*a* is P4. A distance between the outer circumferential portion 11A and a distal end part 112*x* of the movable protrusion 112*b* is P2. The distance P4 is either the same as the distance P2 or larger than the distance P2.

The guide protrusion 114*a* does not have an introduction tapered part provided in the movable protrusions 111*b* and 112*b*. In other words, the guide protrusion 114*a* is not a portion for fixing the magnet 12. The guide protrusion 114*a* is a portion that guides the magnet 12 such that the magnet 12 is brought into contact with the introduction tapered part of the movable protrusion 112*b*.

When the magnet 12 is attached to the outer circumferential portion 11A, a side surface 12*d* of the magnet 12 comes into contact with the introduction tapered part, and the movable protrusions 111*b* and 112*b* are elastically deformed. Therefore, a disposition of the guide protrusion 114*a* in the fourth electromagnetic steel sheet 114 is determined according to an amount of deformation due to the elastic deformation of the movable protrusions 111*b* and 112*b*. In other words, the disposition of the guide protrusion 114*a* is set such that the side surface 12*d* of the magnet 12 does not come into contact with the guide protrusion 114*a*.

In other words, the guide protrusion 114*a* is a displacement restriction portion that restricts displacement of the first movable protrusion 111*b* and the second movable protrusion 112*b* in the circumferential direction.

<Effects of Second Embodiment>

According to the second embodiment, when the third electromagnetic steel sheet 113 is disposed between the first electromagnetic steel sheet 111 and the second electromagnetic steel sheet 112, the movable protrusion 111*b* and the movable protrusion 112*b* do not come into contact with each other. Therefore, the movable protrusion 111*b* and the movable protrusion 112*b* can be elastically deformed more smoothly without being affected by friction, and the magnet 12 can be reliably fixed.

When the magnet 12 is fixed to the outer circumferential portion 11A, even if a position of the magnet 12 is displaced from the rotor core 211, the magnet 12 comes into contact with the guide protrusion 114*a*, and the guide protrusion 114*a* moves the magnet 12 toward the outer circumferential portion 11A. Therefore, it is possible to prevent the magnet 12 from coming into contact with distal ends of the movable protrusions 111*b* and 112*b*. Unnecessary deformation such as buckling of the movable protrusions 111*b* and 112*b* can be prevented. Therefore, fixing of the magnet 12 using the movable protrusions 111*b* and 112*b*, which are prevented from deformation, can be reliably performed.

The third electromagnetic steel sheet 113 is disposed between the first electromagnetic steel sheet 111 and the fourth electromagnetic steel sheet 114. The first electromagnetic steel sheet 111 and two third electromagnetic steel sheets 113 are disposed between the second electromagnetic steel sheet 112 and the fourth electromagnetic steel sheet 114. Therefore, the movable protrusion 111*b* and the guide protrusion 114*a* do not come into contact with each other, and the movable protrusion 112*b* and the guide protrusion 114*a* do not come into contact with each other. Therefore, the movable protrusion 111*b* and the guide protrusion 114*a* can be elastically deformed more smoothly without being affected by friction, and the magnet 12 can be reliably fixed.

Incidentally, in a conventional rotary electric machine, it has been necessary to set a width of a movable positioning protrusion to be smaller than a width of a fixed positioning protrusion. Therefore, there has been a problem in that it is difficult to manufacture the rotor core, and when the magnet is pushed into the rotor core, the movable positioning protrusion is deformed, and the magnet cannot be reliably pressed against the fixed positioning protrusion. Therefore, there has been a problem in that a disposition accuracy of the magnet decreases and motor characteristics such as a cogging torque are deteriorated.

In contrast, according to the second embodiment, since the fourth electromagnetic steel sheet 114 having the guide protrusion 114*a* is used, the magnet 12 can be smoothly pushed into the rotor core 211, and a plastic deformation of the movable protrusions 111*b* and 112*b* can be prevented from occurring. Therefore, the disposition accuracy of the magnet 12 does not decrease, and the problem of deterioration in motor characteristics such as a cogging torque does not occur.

Since the rotor core 211 includes the fourth electromagnetic steel sheet 114 having the guide protrusion 114*a*, the movable protrusions 111*b* and 112*b* are prevented from deforming excessively in the circumferential direction. Therefore, a large plastic deformation in the movable protrusions 111*b* and 112*b* can be prevented from occurring. Further, a pressing force against the magnet 12 by the movable protrusions 111*b* and 112*b* can be prevented from being impaired.

Modified Example of the Second Embodiment

In the second embodiment described above, a structure in which the movable protrusion 111*b* and the movable protrusion 112*b* do not come into contact with each other by disposing the third electromagnetic steel sheet 113 between the first electromagnetic steel sheet 111 and the second electromagnetic steel sheet 112 has been employed. The present modified example shows another structure in which a contact between the movable protrusion 111*b* and the movable protrusion 112*b* is avoided.

Figure 22:
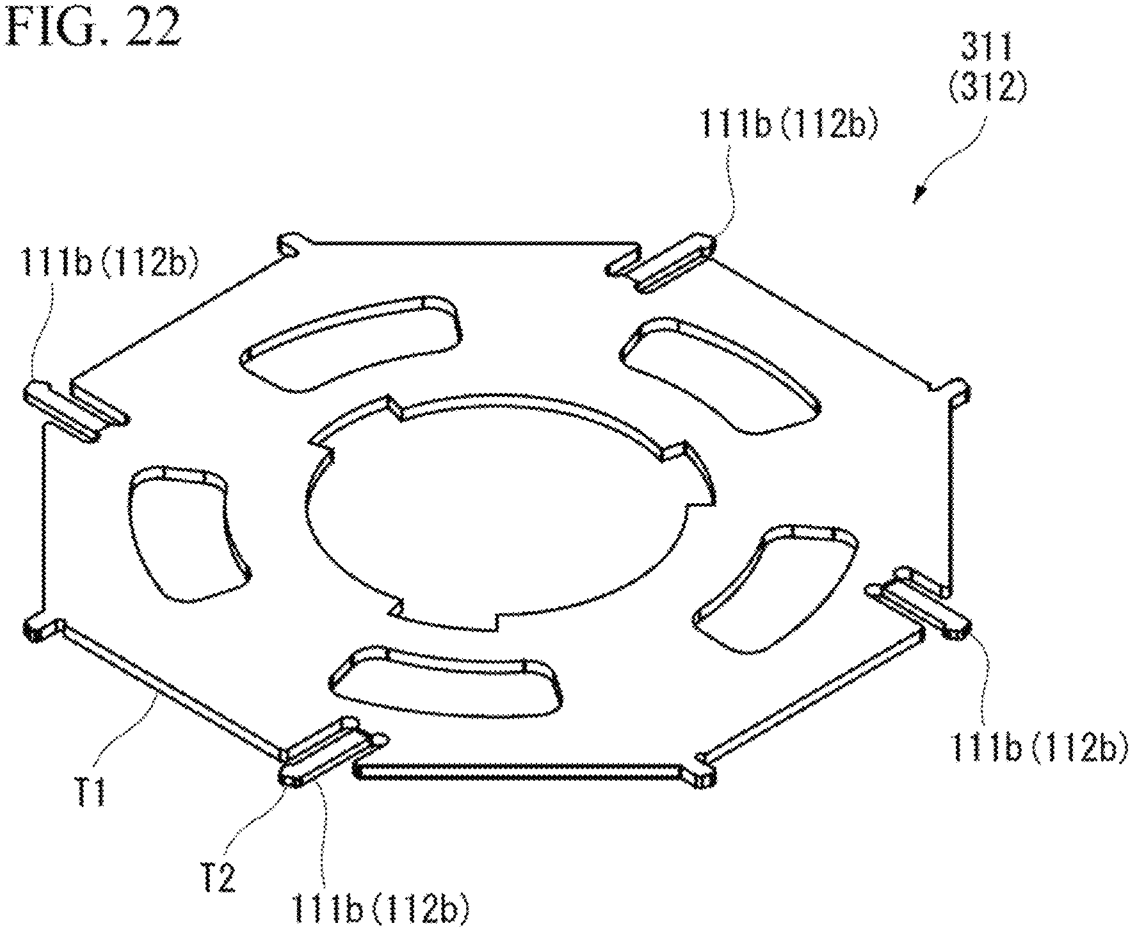
FIG. 22 is a perspective view showing a first electromagnetic steel sheet according to a modified example of the second embodiment.

FIG. 22 is a perspective view showing a first electromagnetic steel sheet 311 according to the present modified example.

As shown in FIG. 22, the first electromagnetic steel sheet 311 has a thickness T1 in the axial direction. The movable protrusion 111*b* of the first electromagnetic steel sheet 311 has a thickness T2 in the axial direction. The thickness T2 is smaller than the thickness T1.

Similarly, a second electromagnetic steel sheet 312 has a thickness T1 in the axial direction. The movable protrusion 112*b* of the second electromagnetic steel sheet 312 has a thickness T2 in the axial direction. The thickness T2 is smaller than the thickness T1. Further, the second electromagnetic steel sheet 312 can be obtained by changing a thickness of the movable protrusion 112*b* of the second electromagnetic steel sheet 112 shown in FIG. 9 in the manner as described above.

When such first electromagnetic steel sheet 311 and second electromagnetic steel sheet 312 are applied to the rotor core 211, the movable protrusion 111*b* and the movable protrusion 112*b* can be elastically deformed more smoothly without being affected by friction, and the magnet 12 can be reliably fixed. Further, since there is no need to use the third electromagnetic steel sheet 113, types of electromagnetic steel sheets can be reduced, and the step of laminating the plurality of electromagnetic steel sheets in the rotor core 211 is simplified.

Third Embodiment

Figure 23:
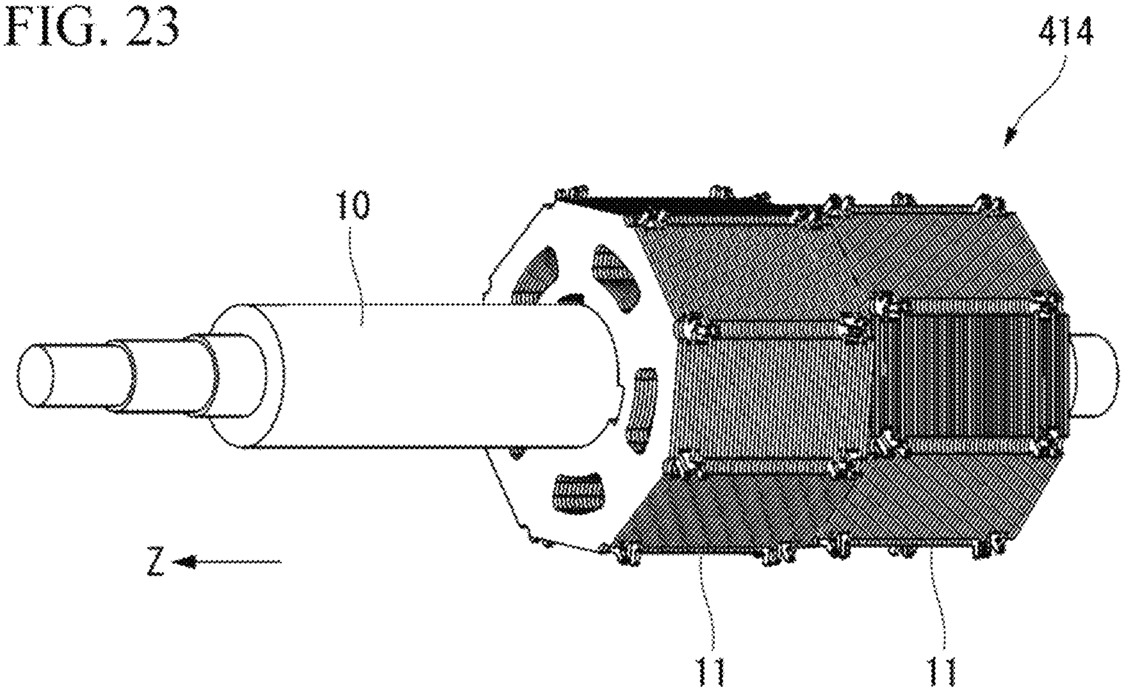
FIG. 23 is a perspective view showing a rotor unit according to a third embodiment, and is a view showing a state before a magnet is fixed to the rotor unit.
Figure 24:
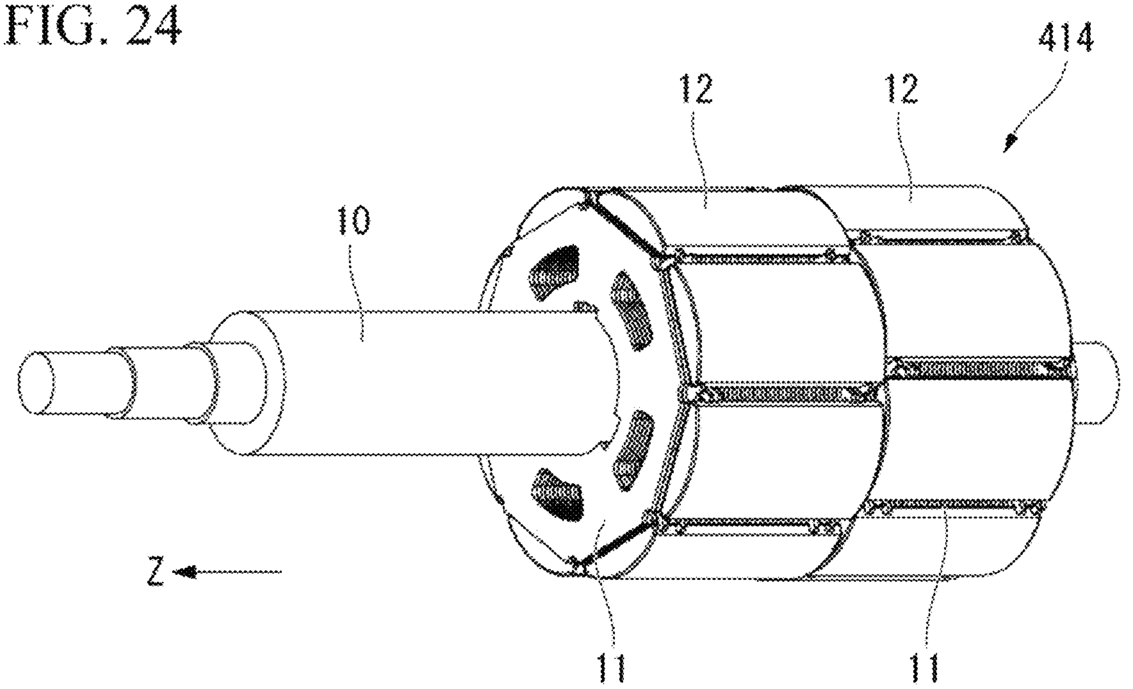
FIG. 24 is a perspective view showing the rotor unit according to the third embodiment.

Next, a rotor unit 414 having a stage skew structure applied to a rotary electric machine 1 will be described. FIG. 23 is a perspective view showing the rotor unit 414 and is a view showing a state before magnets are fixed to the rotor unit. FIG. 24 is a perspective view showing the rotor unit.

<Rotor Unit 414>

As shown in FIG. 23, the rotor unit 414 includes a rotating shaft 10 and two rotor cores 11. The rotating shaft 10 is press-fitted into a first through hole 11*b* of the two rotor cores 11 to be fixed. The two rotor cores 11 are disposed to overlap in a Z direction. The two rotor cores 11 are disposed to be displaced by a predetermined angle in a circumferential direction. The rotor core 11 is the rotor core described in the first embodiment described above.

In other words, the rotary electric machine according to the third embodiment includes a plurality of rotor units 14. Each of the plurality of rotor units 14 corresponds to the rotor unit 14 described above. The plurality of rotor units 14 are fixed to the rotating shaft 10 to overlap each other. The plurality of rotor units 14 are disposed to be displaced from each other in the circumferential direction.

<Method of Assembling Rotor Unit 414>

Next, a method of assembling the rotor unit 414 will be described.

The method of assembling the rotor unit 414 is similar to the method of assembling the rotor unit 14 described above.

First, an adhesive or the like is applied to an outer circumferential surface 11*a* of the rotor core 11 in advance. Thereafter, a plurality of magnets 12 are sequentially inserted onto the outer circumferential surface 11*a* of the rotor core 11.

In a state in which the magnets 12 are in close contact with the outer circumferential surface 11*a* of the rotor core 11, the magnets 12 are pressed against the outer circumferential surface 11*a* by movable protrusions 111*b* and 112*b* to determine positions of the magnets 12, and the positions of the magnets 12 are maintained.

When the adhesive is cured in this state, the rotor unit 414 shown in FIG. 23 is obtained. In the rotor unit 414, the plurality of magnets 12 are fixed to the rotor core 11 with high accuracy.

As described above, in the rotor unit 414 having the stage skew structure, even if the number of rotor cores or the number of magnets increases, it is possible to easily fix the plurality of magnets 12. A temporary holding jig for curing the adhesive used to adhere the magnets 12 is not necessary, and there is no work for attaching or removing the temporary holding jig. Therefore, it is possible to provide the rotary electric machine 1 with even better assembly workability.

Further, in the rotor unit 414, the rotor core 211 described in the second embodiment described above may be used instead of the rotor core 11.

Further, in the present disclosure, the embodiments can be combined, modified, or omitted as appropriate.

REFERENCE SIGNS LIST

1 Rotary electric machine
2 Frame
2A Opening
2B Inner wall surface
2C Inner region
2D Pedestal
2M Frame main body
3 Stator
3A Stator outer surface
3B Stator inner surface
3C Stator upper surface
3D Stator lower surface
4 Insulator
5 Stator winding
6 Terminal
7, 9 Bearing
8 Bearing holder
10 Rotating shaft
10A Central region
10B, 10C End part
11 Rotor core
11*a* Outer circumferential surface
11A Outer circumferential portion
11*b* First through hole
11*c* Engaging recessed portion
11*d* Second through hole
11F Front region
11M Central region
11R Rear region
12 Magnet (first magnet, second magnet)
12*a* Cylindrical surface
12*b* Flat surface
12*c* Side surface
12*d* Side surface
13 Protective tube
14, 414 Rotor unit (rotor)
15 Joint
16 Heat sink
17 Sensor
18 Control device
110 Non-protruding electromagnetic steel sheet
110*a* Recessed portion
110C Outer circumferential corner portion
110L Linear portion
111 First electromagnetic steel sheet
111*a* Fixed positioning protrusion (first fixed positioning protrusion)
111*af* Distal end part
111*ak* Inclined part
111*as* Inclined end part
111*at* Fixed extension surface
111*b* First movable protrusion
111*bx* Movable extension surface
111*c* Introduction tapered part
111C Outer circumferential corner portion
111L Linear portion
111*p* First movable diagonal recessed portion
111*p* Recessed portion
111*q* First movable orthogonal recessed portion
111*q* Recessed portion
111*r*, 111*s*, 111*u* Bottom part
111*t* First fixed extension recessed portion
111*x* Distal end part
112 Second electromagnetic steel sheet
112*a* Fixed positioning protrusion (second fixed positioning protrusion)
112*af* Distal end part
112*ak* Inclined part
112*as* Inclined end part
112*at* Fixed extension surface
112*b* Second movable protrusion
112*bx* Movable extension surface
112*c* Introduction tapered part
112C Outer circumferential corner portion
112L Linear portion
112*p* Second movable diagonal recessed portion
112*q* Second movable orthogonal recessed portion
112*q* Recessed portion
112*r*, 112*s*, 112*u* Bottom part
112*t* Second fixed extension recessed portion
112*x* Distal end part
113 Third electromagnetic steel sheet
113*a* Notch portion
113C Outer circumferential corner portion
113L Linear portion
114 Fourth electromagnetic steel sheet
114*a* Guide protrusion
114*c* Connection part
114C Outer circumferential corner portion
114*d* Vertical extension part
114*e* Inclined part
114*f* Inclined end part
114*g* Distal end part
114L Linear portion
114LA First linear portion
114LB Second linear portion
211 Rotor core
311 First electromagnetic steel sheet
312 Second electromagnetic steel sheet

The invention claimed is:

1. A rotary electric machine comprising:
a stator; and
a rotor comprising a rotating shaft, a laminated steel sheet constituted by a plurality of electromagnetic steel sheets fixed to the rotating shaft and having an outer circumferential portion, and a plurality of first magnets and a plurality of second magnets disposed alternately on the outer circumferential portion in a circumferential direction, and being spaced apart from the stator and surrounded by the stator, wherein
the laminated steel sheet comprises:
a first electromagnetic steel sheet fixing the plurality of first magnets; and
a second electromagnetic steel sheet fixing the plurality of second magnets,
the first electromagnetic steel sheet comprises:
a first fixed positioning protrusion positioning one end of each of the first magnets in the circumferential direction and protruding toward the outside of the first electromagnetic steel sheet; and
a first movable protrusion pressing the other end of each of the first magnets in the circumferential direction toward the first fixed positioning protrusion and protruding toward the outside of the first electromagnetic steel sheet, the first movable protrusion configured to elastically deform more than the first fixed positioning protrusion, and the second electromagnetic steel sheet comprises:

a second fixed positioning protrusion positioning one end of each of the second magnets in the circumferential direction and protruding toward the outside of the second electromagnetic steel sheet; and a second movable protrusion pressing the other end of each of the second magnets in the circumferential direction toward the second fixed positioning protrusion and protruding toward the outside of the second electromagnetic steel sheet, the second movable protrusion configured to elastically deform more than the second fixed positioning protrusion, and wherein a free end length of the first movable protrusion is larger than a free end length of the first fixed positioning protrusion, and a free end length of the second movable protrusion is larger than a free end length of the second fixed positioning protrusion.

2. The rotary electric machine according to claim 1, wherein the first electromagnetic steel sheet and the second electromagnetic steel sheet are disposed in a first region serving as one region in an axial direction of the rotating shaft and a second region serving as the other region in the axial direction.

3. The rotary electric machine according to claim 2, wherein the first electromagnetic steel sheet and the second electromagnetic steel sheet are disposed between the first region and the second region.

4. The rotary electric machine according to claim 1, wherein the laminated steel sheet comprises a third electromagnetic steel sheet disposed between the first electromagnetic steel sheet and the second electromagnetic steel sheet in the axial direction of the rotating shaft, the third electromagnetic steel sheet is in contact with the first electromagnetic steel sheet and the second electromagnetic steel sheet, the third electromagnetic steel sheet has a notch portion, and the notch portion does not overlap the first movable protrusion of the first electromagnetic steel sheet and the second movable protrusion of the second electromagnetic steel sheet when viewed in the axial direction.

5. The rotary electric machine according to claim 1, wherein a thickness of the first movable protrusion of the first electromagnetic steel sheet in the axial direction of the rotating shaft is smaller than a thickness of the first electromagnetic steel sheet, and a thickness of the second movable protrusion of the second electromagnetic steel sheet in the axial direction is smaller than a thickness of the second electromagnetic steel sheet.

6. The rotary electric machine according to claim 1, wherein the laminated steel sheet comprises a fourth electromagnetic steel sheet having a plurality of guide protrusions spaced apart in the circumferential direction, each of the plurality of guide protrusions protrudes toward the outside of the fourth electromagnetic steel sheet and has a distal end part, one of the plurality of guide protrusions overlaps the first movable protrusion when viewed in the axial direction of the rotating shaft, a distance between the outer circumferential portion of the rotor and the distal end part of the guide protrusion is larger than or equal to a distance between the outer circumferential portion of the rotor and a distal end part of the first movable protrusion, one of the plurality of guide protrusions overlaps the second movable protrusion when viewed in the axial direction of the rotating shaft, and a distance between the outer circumferential portion of the rotor and the distal end part of the guide protrusion is larger than or equal to a distance between the outer circumferential portion of the rotor and a distal end part of the second movable protrusion.

7. The rotary electric machine according to claim 6, wherein the guide protrusion is a displacement restriction portion that restricts displacement of at least one of the first movable protrusion and the second movable protrusion in the circumferential direction.

8. The rotary electric machine according to claim 1, comprising a plurality of rotors each corresponding to the rotor, wherein the plurality of rotors are fixed to the rotating shaft to overlap each other, and the plurality of rotors are disposed to be displaced from each other in the circumferential direction.

* * * * *